United States Patent
Ashmore

(10) Patent No.: US 10,414,053 B2
(45) Date of Patent: Sep. 17, 2019

(54) ROBOTIC GRIPPER FOR AUTONOMOUS RENDEZVOUS AND CAPTURE OF SATELLITES

(71) Applicant: U.S.A. as represented by the Administrator of the National Aeronautics and Space Administration, Washington, DC (US)

(72) Inventor: Matthew S. Ashmore, Glen Burnie, MD (US)

(73) Assignee: U.S.A. as represented by the Administrator of the National Aeronautics and Space Administration, Washington, DC (US)

( * ) Notice: Subject to any disclaimer, the term of this patent is extended or adjusted under 35 U.S.C. 154(b) by 147 days.

(21) Appl. No.: 15/454,536

(22) Filed: Mar. 9, 2017

(65) Prior Publication Data
US 2018/0257242 A1    Sep. 13, 2018

(51) Int. Cl.
| B66C 15/00 | (2006.01) |
| B64G 1/10 | (2006.01) |
| B25J 15/00 | (2006.01) |
| B64G 4/00 | (2006.01) |

(52) U.S. Cl.
CPC ........ B25J 15/0028 (2013.01); B64G 1/1078 (2013.01); *B25J 15/0052* (2013.01); *B64G 2004/005* (2013.01)

(58) Field of Classification Search
CPC ........................... B25J 15/0028; B64G 1/1078
USPC ................ 294/86.4, 119.1; 244/172.4, 172.5
See application file for complete search history.

(56) References Cited

U.S. PATENT DOCUMENTS

| 4,028,926 | A | * | 6/1977 | Olesovsky | ............... | B21D 7/16 294/86.4 |
| 4,195,804 | A | * | 4/1980 | Hujsak | ................... | B64G 1/646 244/172.4 |
| 4,260,187 | A | * | 4/1981 | Frosch | ................... | B64G 1/646 244/172.5 |
| 5,360,249 | A | * | 11/1994 | Monforte | ............. | B25J 15/0475 294/119.1 |
| 9,399,295 | B2 | * | 7/2016 | Roberts | ................ | B25J 15/0226 |
| 9,975,252 | B2 | * | 5/2018 | Zimmerman | ........ | B25J 15/0028 |
| 2005/0258311 | A1 | * | 11/2005 | Scott | ...................... | B64G 1/007 244/172.4 |
| 2015/0166202 | A1 | * | 6/2015 | Maediger | ............... | B64G 1/222 244/171.1 |
| 2015/0314893 | A1 | * | 11/2015 | Rembala | ................ | B64G 1/646 244/172.5 |

* cited by examiner

*Primary Examiner* — Paul T Chin
(74) *Attorney, Agent, or Firm* — Matthew F. Johnston; Bryan A. Geurts; Mark P. Dvorscak

(57) ABSTRACT

A robotic gripper for rigidly grasping a section of a Marman ring of a satellite, the robotic gripper having an outboard jaw which interfaces to an outer diameter side of the Marman ring, a inboard jaw which interfaces to an inner diameter side of the Marman ring, and a palm which interfaces to a separation surface of the Marman ring. The jaws, when grasping the section of the Marman ring, execute a two-stage motion comprising a first movement toward the opposing jaw in a direction parallel to the palm, and a second movement of drawing the Marman ring down against the palm or other suitable surface in order to fully rigidize the grasp.

19 Claims, 10 Drawing Sheets

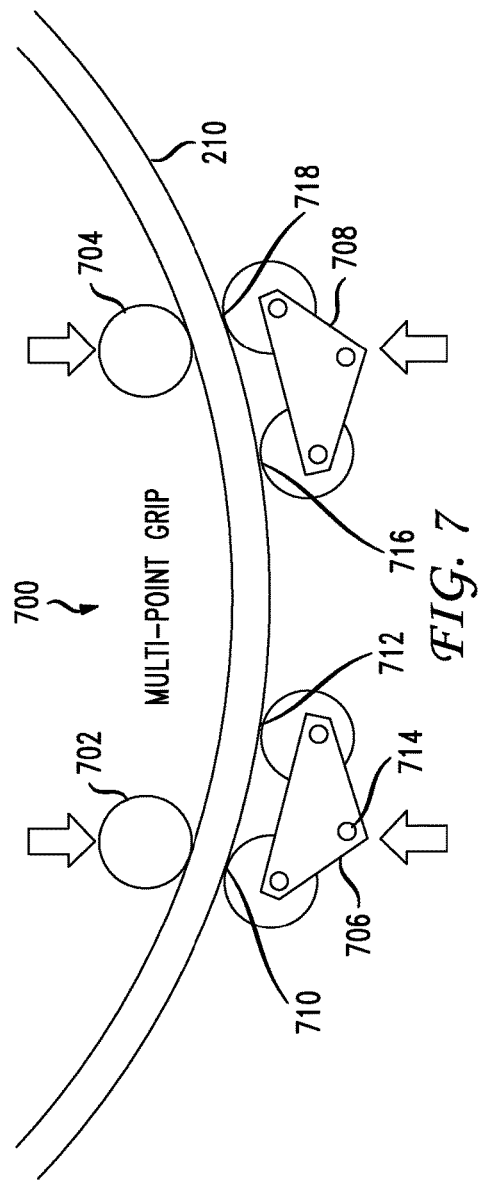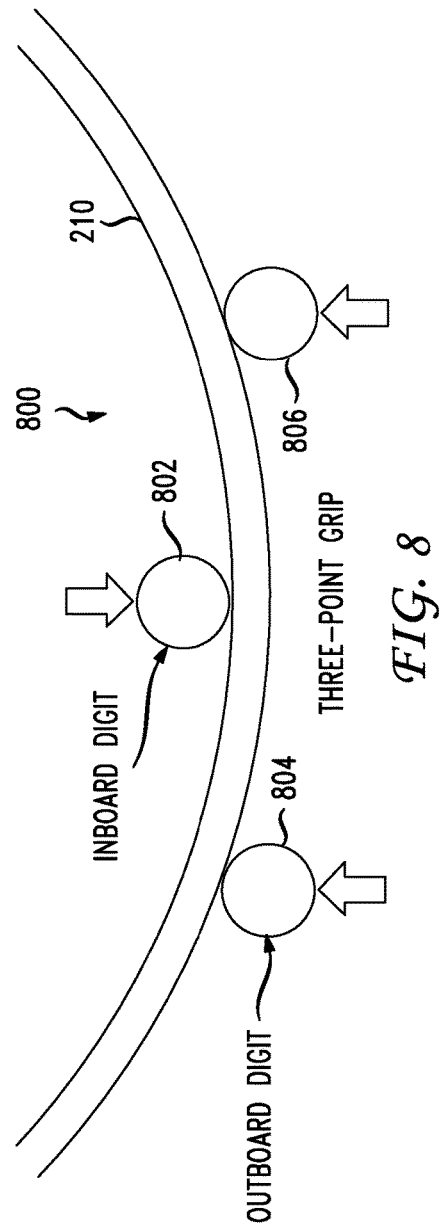

ROBOTIC GRIPPER FOR AUTONOMOUS RENDEZVOUS AND CAPTURE OF SATELLITES

BACKGROUND

1. Technical Field

The present disclosure relates to a robotic gripper for use in capturing satellites in zero-gravity and microgravity space environment by gripping the launch adapter interface (alternatively known as "payload launch adapter," "separation ring," "payload attach fitting," "Marman ring," etc.) which is part of the satellite. The particular structure of the gripper is optimized for efficiently and safely engaging with the Marman ring, in a variety of configurations, for different satellites.

2. Introduction

In recent years, a growing interest in in-orbit servicing of space assets has led to a number of studies and demonstrations, both terrestrial and orbital, to prove the feasibility of sending a servicing spacecraft to rendezvous with, capture, service, and release a client asset, Such servicing may include refueling of propellant, replenishing pressurant gases, repairing or replacing solar arrays or batteries, changing instruments or other payload elements, installing auxiliary sensor or attitude control packages, etc. As more demonstrations are successfully completed, and the cost-benefit tradeoff between servicing an already-orbiting asset versus launching a replacement vehicle and disposing of its pre-existing counterpart demonstrates the economic feasibility of servicing, it has become apparent that an international market for an in-orbit servicing infrastructure is rapidly emerging. Among all subsets of activity under the in-orbit servicing umbrella, there is a common need for the servicing spacecraft to acquire and dock with the client vehicle. In order to interface with a satellite or other space asset, the servicing vehicle must interface with the client in a way that will not damage the client or cause it to be significantly disturbed from its stable orbit attitude. Currently, two schools of thought have dominated the discussion on how best to establish a physical connection between servicer and client; the first being direct docking (berthing) between vehicles, whereby in the most commonly seen proposals the servicer executes a mechanical coupling to either the client's Marman ring (if available) or the nozzle of the client's liquid apogee engine/motor (LAE/LAM); the second being robotic capture, whereby one or more dexterous robotic arms, equipped with a gripping device, reach out and engage any of the aforementioned client interfaces, then pull the client into a more substantial berthing structure.

This disclosure relates to the latter method of rendezvous, and specifically to structures for a gripper that can initiate capture of a client satellite through grasping its Marman ring. A typical Marman ring consists of an aluminum annulus, commonly ranging from 937 to 1,666 mm ire outer diameter, which is structurally integrated to the space vehicle, often to the central propulsion module of the spacecraft bus structure. The outer diameter of the ring features an angled flange, commonly 15° offset from the flat mating surface of the ring. The mating launch vehicle payload attach fatting features a similar ring also possessing an angled flange, such that when the satellite is mated to the launch vehicle, the angled flanges form a "V" in cross-section whose apex lies on the separation plane between the two rings. A clamp band (alternatively known as a "V-band" or "Marman band") features an array of shoes, mounted in a radially symmetric pattern along separable straps; the shoes feature an inverted "V" cross-section such that when the straps are positioned around the mated rings and fastened together, the shoes engage the angled flanges of both satellite and launch vehicle rings, clamping the rings together in rigid, preloaded contact. The straps are fastened together with one or more bolts or studs that may be cut or released using a pyrotechnic bolt cutter, non-explosive actuator, separation nut, or other suitable means for quickly releasing the strap preload, causing the shoes to quickly spread radially outboard from the rings and thereby freeing the satellite to be released form the launch vehicle at the end of the ascent phase. The mating surface of the ring may feature an annular track positioned coaxially with the outer diameter which receives a corresponding annular protrusion from the launch vehicle in order to react to shear loads during launch and ascent, or the track/boss pair may be furnished in the reverse. The mating surface is often furnished with a chemical conversion coating for electrical bonding, whereas the angled flange may be anodized or otherwise coated to reduce friction and resist cold-welding with the Marman band shoes. The ring may also feature keyways, various pressure pads for receiving the plunger of one or more kick-off devices, and/or umbilical connectors for supplying power and data communication between launch vehicle and satellite. Those skilled in the art will acknowledge other similar methods of attachment between satellite and launch vehicle, such as burn-wire separation rings, etc.

The Marman ring was chosen as the target grasping interface due to a) its nearly ubiquitous use on both government and commercial satellites; b) relative accessibility due to the fact that the surrounding area must be clear of obstructions for satisfactory interface to the launch vehicle; and c) the standardization of ring geometry across multiple launch vehicle platforms.

Next are discussed known structures for grippers. Most commercially available industrial/laboratory grippers do not execute a grasp; they perform a pinch, wherein grasping implies that three rotations and three translations are all constrained by discrete motion stops, and pinching constrains one translation and to some extent two rotations, with all other translations and rotations constrained solely by friction.

Pinch-type robotic graspers are commonly manifested in the form of a parallel-jaw pincher or a rotary-jaw claw. Occasionally, rotary jaws will be outfitted with tips that are suspended on four-bar linkages in such a way as to impart substantially parallel motion through the entire jaw stroke, but the tips still undergo a net arcing motion relative to the grasper chassis, meaning that objects of different widths are pinched at different heights relative to the chassis. Large clamp preloads are employed in order to produce enough friction to constrain all degrees of freedom—this tends to result in over-designed mechanisms that are not optimized for mass or volume.

Known are numerous descriptions of underactuated mechanisms whereby a more conformable grasp permits a mechanism to interface to objects of varying shape and size.

Industrial robotic grippers are commonly actuated via hydraulic and pneumatic systems, both of which are inappropriate for space applications. Motor-driven grippers often employ brushed DC motors, which are not preferred for use in the vacuum of space due to the thermal and contamination concerns with carbon brushes. Also, owing to the ability to provide constant lubrication, motor-driven grippers often feature leadscrews (as opposed to ball screws) as the power transmission element; in space, a leadscrew comprises a single-point failure; being a device that relies on sliding surface action with a finite lubricant supply, leadscrews decrease system reliability, especially in a fully-reversing, high-cycle element such as a gripper. Additionally, industrial grippers often feature oil-impregnated bronze bushings and T-slot or dovetail linear guides for the parallel jaws, all of which reduce system reliability by introducing sources for jamming and galling. Compatibility among coefficients of thermal expansion between different materials is usually not a consideration, and therefore clearances between moving parts, as well as magnitude of interference fits, are not afforded the same rigor of attention as in space flight designs.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are grippers, systems, methods, and non-transitory computer-readable storage media related to a gripping operation. Disclosed herein is a robotic gripping device (gripper) that can be used to grasp and control an out-of-fuel or otherwise disabled satellite (client) as part of a robotic satellite servicing mission. Specifically, the gripper interfaces to the separation ring (Marman ring) of the client, it possesses a grasping jaw geometry which, when closed, is sufficient to constrain all six degrees of freedom of motion between the servicing spacecraft (servicer) and the client. In this way, the gripper effects rigid capture of the client and, since it is able to transmit forces and moments about all three axes of a cartesian coordinate system mutual to the coupled vehicle system, it permits the servicer to perform primary attitude control for the dual-vehicle stack during a mated servicing sortie.

In one aspect, a robotic gripper is disclosed for rigidly grasping a section of a Marman ring. The robotic gripper can include an outboard jaw which interfaces to an outer diameter or outboard side of the Marman ring, an inboard jaw which interfaces to an inner diameter or inboard side of the Marman ring, and a palm which interfaces to a separation surface of the Marman ring. The outboard jaws, when grasping a section of the Marman ring, may execute a two-stage motion comprising a first movement radially inward, toward the opposing jaw in a direction parallel to the palm, which executes a radial clamp of the Marman ring across the ring's outer diameter and the inner diameter surfaces; and a second movement wherein the clamped jaws move in a direction toward, and substantially perpendicular to, the palm, drawing the clamped Marman ring down against the palm and completing a rigid and fully-constrained grasp. In ono aspect, the two motions may be imparted as separate phases of the gasp sequence, driven by separate mechanisms. In another aspect, the two motions may be combined into one continuous sequence whereby the clamping and draw-down actions execute simultaneously or nearly simultaneously, driven by a single manner of actuation. In a third aspect, the two motions may be driven by a single manner of actuation, but do not occur simultaneously; rather, the completion of the clamping phase triggers the initiation of the draw-down phase.

BRIEF DESCRIPTION OF THE DRAWINGS

FIGS. 7 and 8 illustrate schematically a multi-point grasp and a three-point grasp;

DETAILED DESCRIPTION

Various grippers, including systems and methods are disclosed which relate to the structure and function of a gripper tool which, when attached distally to a robotic arm, enables a servicing vehicle to acquire and interface with the Marman ring of a client satellite. Various embodiments of the disclosure are described in detail below. While specific implementations are described, it should be understood that this is done for illustration purposes only. Other components and configurations may be used without parting from the spirit and scope of the disclosure.

This disclosure first describes basic computer device components that can be used to control gripper operations. Following the description of the basic computing components, this disclosure shall describe the marman rings and their various configurations and then shall introduce various embodiments of the gripper. The follow computer description can provide an example of control electronics which can connect to the gripper through a robotic arm or other connecting device to control various functions and operation of the gripper.

Figure 1:
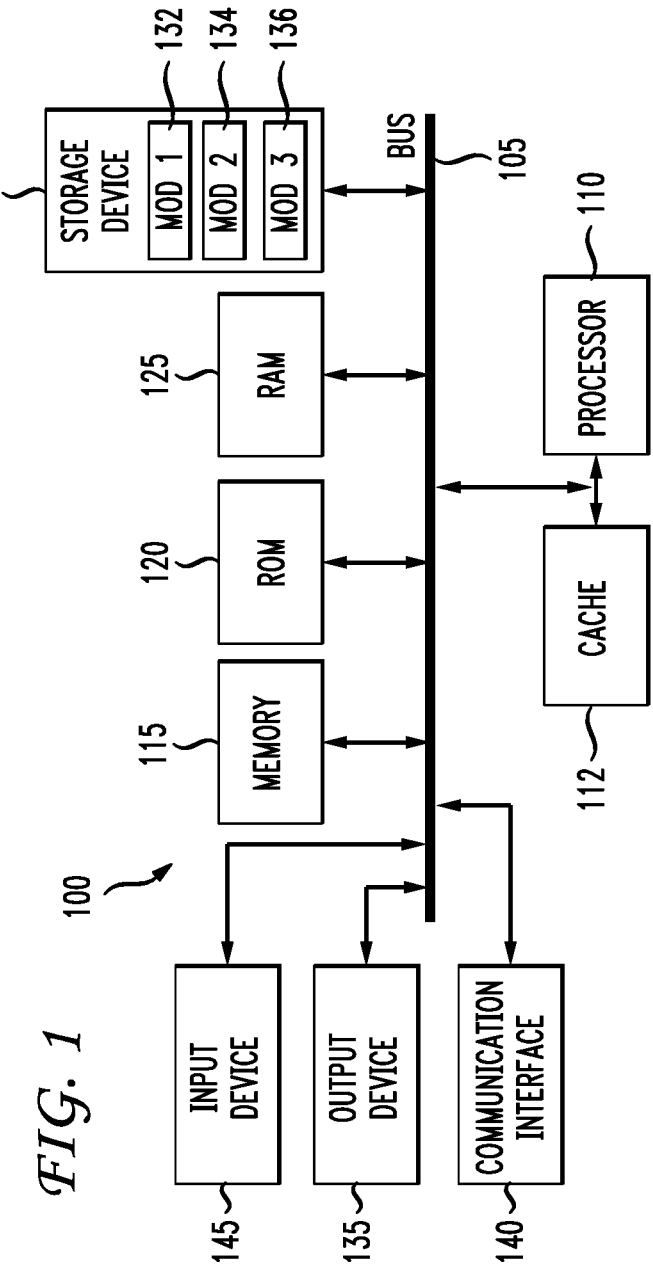
FIG. 1 illustrates an example system embodiment.

The disclosure first turns to FIG. 1 which discloses some basic hardware components that can apply to system examples of the present disclosure. With reference to FIG. 1, an exemplary system and/or computing device 100 includes a processing unit (CPU or processor) 110 and a system bus 105 that couples various system components including the system memory 115 such as read only memory (ROM) 120 and random access memory (RAM) 125 to the processor 110. The system 100 can include a cache 112 of high-speed memory connected directly with, in close proximity to, or integrated as part of the processor 110. The system 100 copies data from the memory 115, 120, and/or 125 and/or the storage device 130 to the cache 112 for quick access by the processor 110. In this way, the cache provides a performance boost that avoids processor 110 delays while waiting for data. These and other modules can control or be configured to control the processor 110 to perform various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, configured to control the processor 110 as well as a special-purpose processor where software instructions are incorporated into the processor. The processor 110 may be a self-contained computing system, containing multiple cores or processors, a bus, memory controller, cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or the cache 112, or can operate using independent resources. The processor 110 can include one or more of a state machine, an application specific integrated circuit (ASIC), or a programmable gate array (PGA) including a field PGA.

The system bus 105 may be any of several types of bus structures including a memory bus or memory controller, a peripheral bus, and a local bus using any of a variety of bus architectures. A basic input/output system (BIOS) stored in ROM 120 or the like, may provide the basic routine that helps to transfer information between elements within the computing device 100, such as during start-up. The computing device 100 further includes storage devices 130 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 130 is connected to the system bus 105 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 110, bus 105, an output device such as a display 135, and so forth, to can out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 100 is a small, handheld computing device, a desktop computer, or a computer server. When the processor 110 executes instructions to perform "operations", the processor 110 can perform the operations directly and/or facilitate, direct, or cooperate with another device or component to perform the operations.

Although the exemplary embodiment(s) described herein employs a storage device such as a hard disk 130, other types of computer-readable storage devices which can store data that are accessible by a computer, such as magnetic cassettes, flash memory cards, digital versatile disks (DVDs), cartridges, random access memories (RAMS) 125, read only memory (ROM) 120, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 125 or memory 115 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and underlying hardware necessary to execute the virtualization layer. The system 100 can include a physical or virtual processor 110 that receive instructions stored in a computer-readable storage device, which cause the processor 110 to perform certain operations. When referring to a virtual processor 110, the system also includes the underlying physical hardware executing the virtual processor 110.

This disclosure now turns to the details of the gripper. The gripper itself is part of a larger autonomous rendezvous and capture system, notionally including but not limited to the robotic arm, an arm end effector which supplies electrical and/or mechanical power input to the gripper in order to drive the gripping mechanism, power and control electronics, arm closed-loop control software algorithms, external sensing devices for establishing position and attitude estimation of the gripper relative to the target Marman ring, and external sensing devices for triggering the grasp sequence. Sensing devices for position and pose estimation can include cameras to execute autonomous machine vision, laser ranging instruments, etc. Sensing devices for grasp triggering can include strain gages or a force/torque sensor to detect contact between the gripper and Marman ring, or optical or proximity sensors to assess whether the Marman ring is close enough to a chosen feature on the gripper, and whether the relative orientations of gripper and Marman ring are well-enough aligned to initiate grasping.

In a notional concept of operations, a servicer would approach the client in an autonomous rendezvous and capture maneuver. When the servicer's sensor suite confirms that the distance, orientation, and relative translational and angular rates with respect to the client are within an acceptable range, the servicer enables the grasping sequence, wherein one or more robotic arms, equipped with grippers, extend forward to the client. When the gripper/servicer sensors indicate that the client Marman ring is sufficiently within the capture range of the gripper, a trigger signal is sent to the robot control system which commands the end effector to drive the mechanism of the gripper and effect closure around the Marman ring.

The gripper is a mechanical device which receives inputs from a control mechanism of a robotic arm. From the perspective of the gripper, the robot arm and its control electronics can be viewed as a 'widget' to which the gripper is attached. Requirements for controlling the gripper include, at least in part, one or more of the following principles: 1) How accurately the robot arm can position the gripper relative to the pre-selected desired grasp point on the Marman ring before initiating the grasp. The accuracy budget includes lateral misalignment, angular misalignment, relative lateral velocity between the gripper and the client, and relative angular velocity between the gripper and the client; 2) How, once in the ready-to-grasp position, the gripper communicates a triggering signal to the robot arm control system to initiate the grasp; 3) How rapidly the robot arm end effector (a control mechanism for controlling the gripper function) can drive the mechanisms within the gripper, and how much torque or force can be applied; 4) The resolution, and accuracy, of speed and torque that can be commanded from the end effector, if equipped with a motorized torque output, to drive the gripper mechanisms; 5) How stiff—or compliant—the gripper jaws need to be during the grasp cycle, and how this stiffness relates to the ability of the robot system to achieve stability through its compliance control algorithms; 6) What surface coatings are required to be compatible with the robot system's autonomous vision cameras, and what areas need to be optimized so as not to obscure the camera field of view; 7) What surface coatings or other features are required to be compatible with the voltage potential mitigation system between the client and the servicer (since the gripper will be the first device from the servicer to touch the client, and there may be a significant difference in voltage between the two vehicles); and 8) What the limits are for mass and center-of-gravity offset from the mating interface between the gripper and the robot arm end effector.

Figure 2:
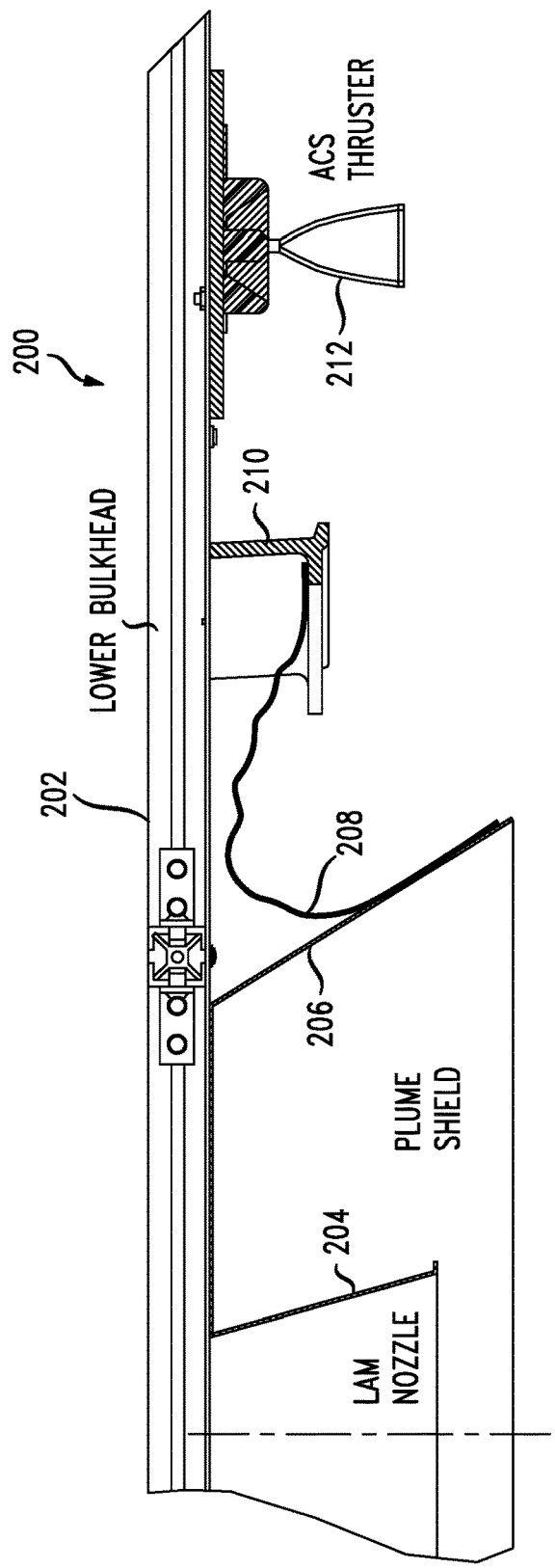
FIG. 2 illustrates a partial cross-section of a Marman ring and associated structures on the client satellite.

FIG. 2 illustrates the basic components of the Marman ring and surrounding area of a notional client satellite 200. The lower bulkhead 202 has attached to it or protruding from it such features as a liquid apogee motor (LAM) nozzle 204 and a plume or heat shield 206 as well as multi-layer insulation or thermal insulation 208 which, among other places, may be attached to the upper surface of the inner diameter flange 214 of the Marman ring 210. A portion of the Mammal ring 210 is also shown as well as an attitude control system (ACS) thruster 212 both protruding from the lower bulkhead. It should be noted that "lower bulkhead" may represent any surface or exterior panel of the client satellite, as there is not necessarily any up-down definition with regard to the client; from the perspective of the gripper, it is convenient to visualize the device operating "underneath" the client satellite, hence the use of the term "lower." The gripper mechanism is configured such that it can navigate through or around features in the periphery of the target grasp zone and grasp a portion of the Marman ring 210 without contacting other components such as the plume shield 206 and the ACS thruster 212. Clearance distances to peripheral components that represent "no-touch" items may be as small as a few inches.

Figure 3:
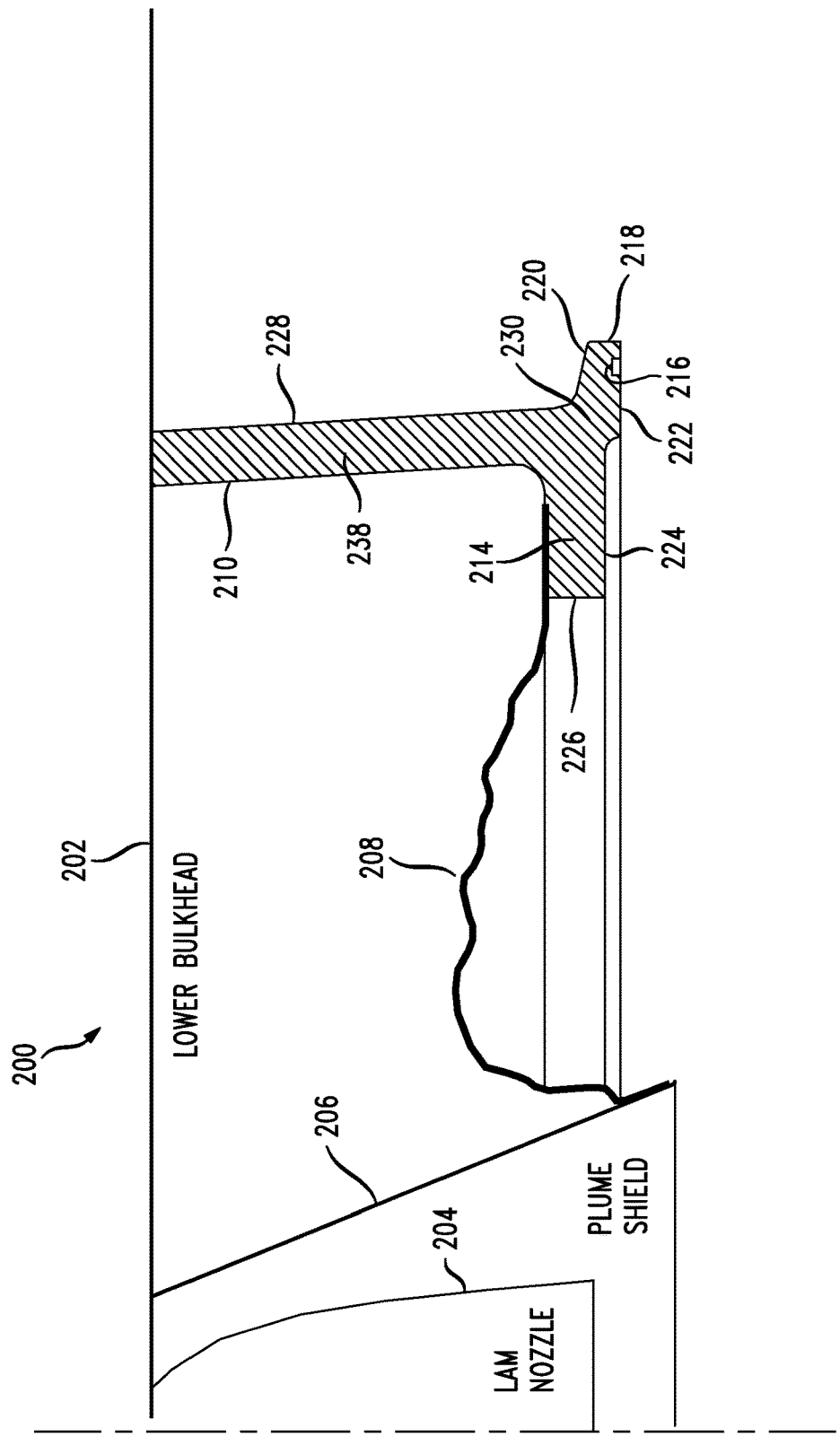
FIG. 3 illustrates a typical profile of a Marman ring.

FIG. 3 illustrates a more detailed view of the satellite 200 with the lower bulkhead 202, the LAM nozzle 204, the plume shield 206, the thermal insulation 208 and a cross-sectional view of the Marmara ring 210. Various structures are provided by way of example to illustrate the features of a notional Marman ring. An inner diameter flange 214 connects the thermal insulation 208 on one end with the plume shield 206 on the other. The Marman ring 210 features an outer diameter 218 on its flange 230. The upper surface 220 of flange 230 incorporates an angle, nominally 15°, with respect to the separation surface 222. Toward the outer diameter 218, the separation surface 222 features an annular groove 216 which mates with a corresponding annular protrusion on the launch vehicle and is used to react shear loads between the launch vehicle and satellite. Inboard from the shear groove 216, the separation surface 222 features an area of removed material, resulting in a discontinuous surface step 224. This surface 224 forms the bottom of the inner diameter flange 214 and provides an available area against which a force may be applied from kick-off springs or other features that urge the satellite away from the launch vehicle upon separation. The inner diameter flange 214 terminates at the inner diameter 226. Extending away from, and relatively perpendicular to a line drawn between the inner diameter flange 214 and the outer diameter flange 230 is an annular web 228, which offsets the flange and separation surface features from the rest of the satellite in order to provide clearance for the Marman band and tool access for attaching the satellite to the launch vehicle. Not shown is how the web ties in to the structure of the satellite, which varies significantly between spacecraft bus designs. Also shown in FIG. 3 are various example widths of components and distances between various components and features of the Marman ring 210 and example angles such as the example 86.6 degree angle between the web 228 and the inner diameter flange 214. Any values shown in FIG. 3 are example values and represent the fact that the various Marman rings 210 have particular configurations that were taken into account when designing the disclosed gripper.

Figure 4:
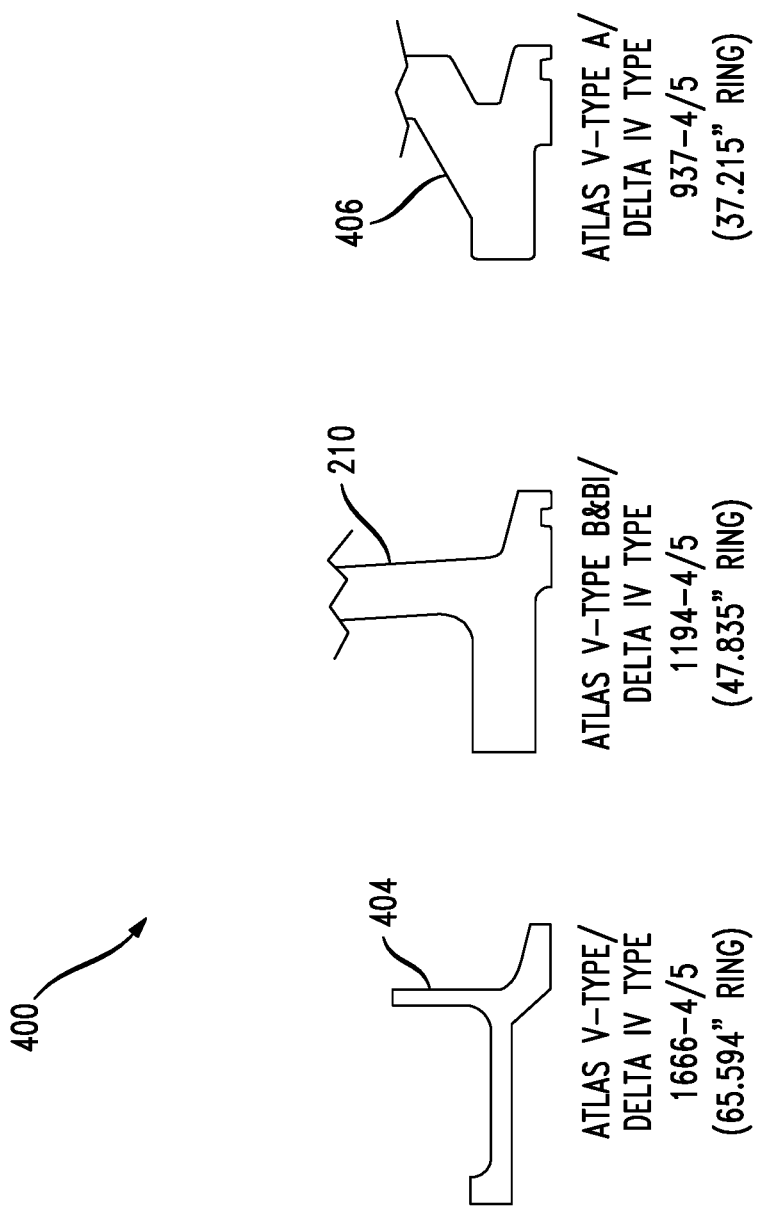
FIG. 4 illustrates some of the various typical profiles for Marman rings.

FIG. 4 illustrates a variety of cross-sectional views 400 of standard Marman rings, any of which the gripper may be called upon to grasp, including an Atlas V Type D/Delta IV Type 1666-4/5 ring 404, an Atlas V Type B & B1/Delta IV Type 1194-4/5 ring 210, and an Atlas V Type A/Delta IV Type 937-4/5 ring 406. These cross-sections illustrate that various satellites employ an array of different Marman ring profiles, depending on the launch vehicle. The gripper tool disclosed herein includes embodiments which are tailored for one of these profiles and embodiments which are universally able to grasp any of the three illustrated profiles.

Figure 5:
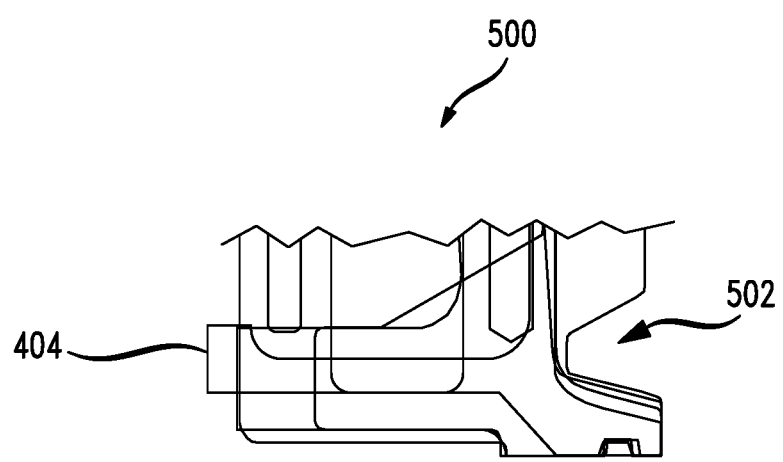
FIG. 5 illustrates a superimposed composite profile of the various Marman rings.

FIG. 5 illustrates an overlapping view 500 of the various Marman rings 210, 404 and 406. As can be appreciated, the need to accommodate the geometric nuances of the various profiles increases the complexity of the design. For example, the Marman ring 210 notionally possesses the thermal insulation 208 discussed above that is attached to the upper surface of the inner diameter flange. Profile 404 is configured such that a pinch grasp along the local horizontal coordinate frame induces a tip-out moment which risks sending the ring tumbling out of the jaws due to the placement of the reaction forces. As shall be seen, the stricture disclosed herein addresses these various geometries appropriately. Notably, all of the designs have a common area 502 lying outboard of the outer diameter flange angle 220 that is exploited by the gripper tool to engage each different profile.

Figure 6:
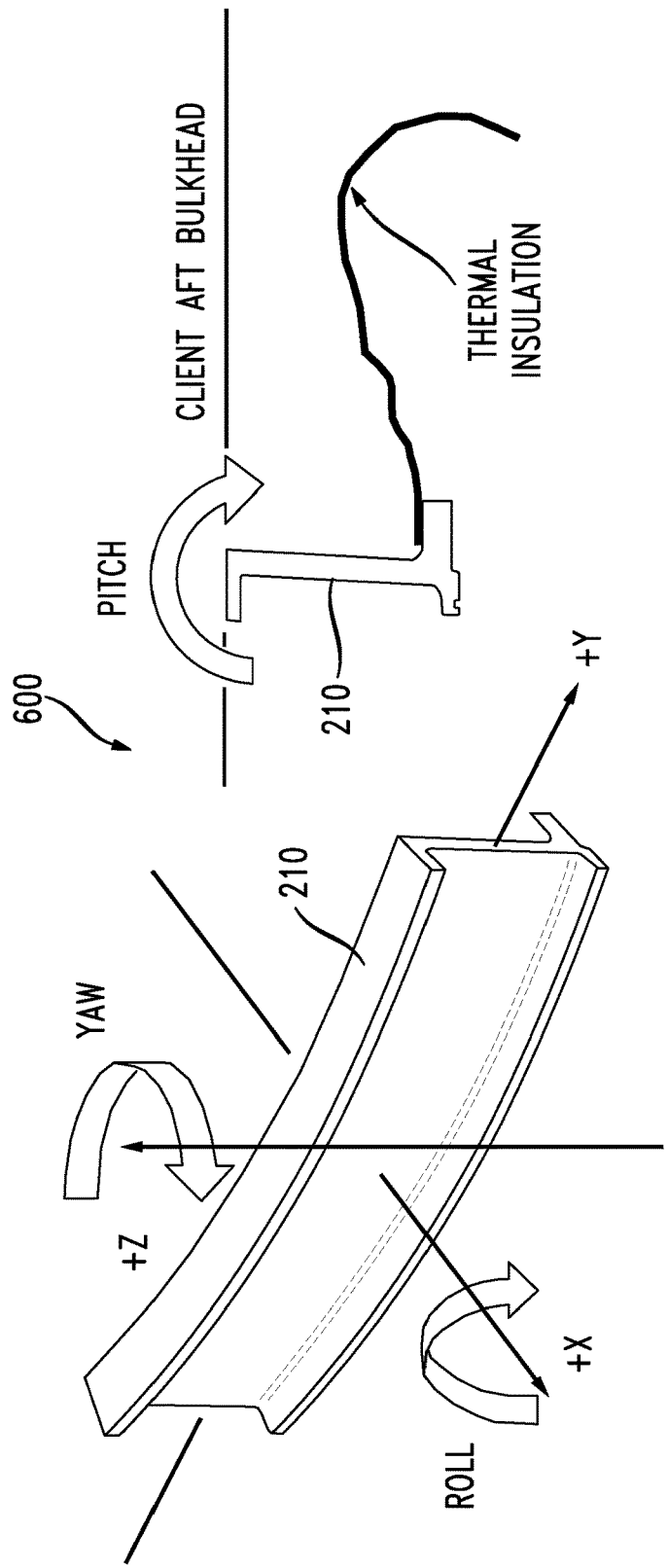
FIG. 6 illustrates a notional coordinate system to be used in discussion of gripping operations and to establish common nomenclature in describing misalignments of the Marman ring relative to the gripper.

FIG. 6 illustrates an arbitrarily chosen coordinate system 600 which helps to establish conventions of translational and rotational misalignments of a Marman ring with respect to an observer fixed on the gripper. For example, rotation of the Marman ring 210 around the Z axis would be a yaw motion relative to the gripper, and similarly rotation around the X axis would constitute a roll motion. Also shown is a rotation of the Marman ring 210 around the Y axis which would be considered a pitch relative to the gripper.

FIG. 7 illustrates schematically a multipoint grip 700 that can be used to adequately clamp the Marman ring 210 across its inner diameter 218 and outer diameter 226. The clamping comprises only the first element of the clamp+draw-down sequence that is required to rigidize the grasp. Note that in each instance where Marman ring 210 is illustrated, it is meant to represent any of the Marman ring geometries disclosed in FIG. 4 as well as other geometries. In FIG. 7A, an example tool would include an inboard grasping point 702 in connection with outboard grasping points 710 and 712, attached to an equalization structure 706. Grasping points 710 and 712 are rotatably mounted about their central axes to equalization structure 706 so as not to slide against Marman ring 210 during grasping. Similarly, equalization structure 706 is pivotally mounted 714 to a notional gripper mechanism in such a way as to permit the equalization structure to rotate as required during the grasp in order that the forces and moments delivered by grasping points 710 and 712 place the equalization structure 706 substantially in static equilibrium about the pivot point 714. In this way, over-constraint of the grasp and excessive sliding against the surfaces of Marman ring 210 is avoided. An opposing set of grasp points 704, 716 and 718, as well as an opposing equalization structure 708 balance out the mechanism.

FIG. 8 illustrates schematically a three-point grip 800 in which an inboard digit 802 is brought into opposing compressive contact with respect to outboard digits 804 and 806 in order to clamp Marman ring 210. The embodiments disclosed herein incorporate surface geometries in the gripping jaws that cause a three-point grip to be executed when clamping the client Marman ring.

Figure 9:
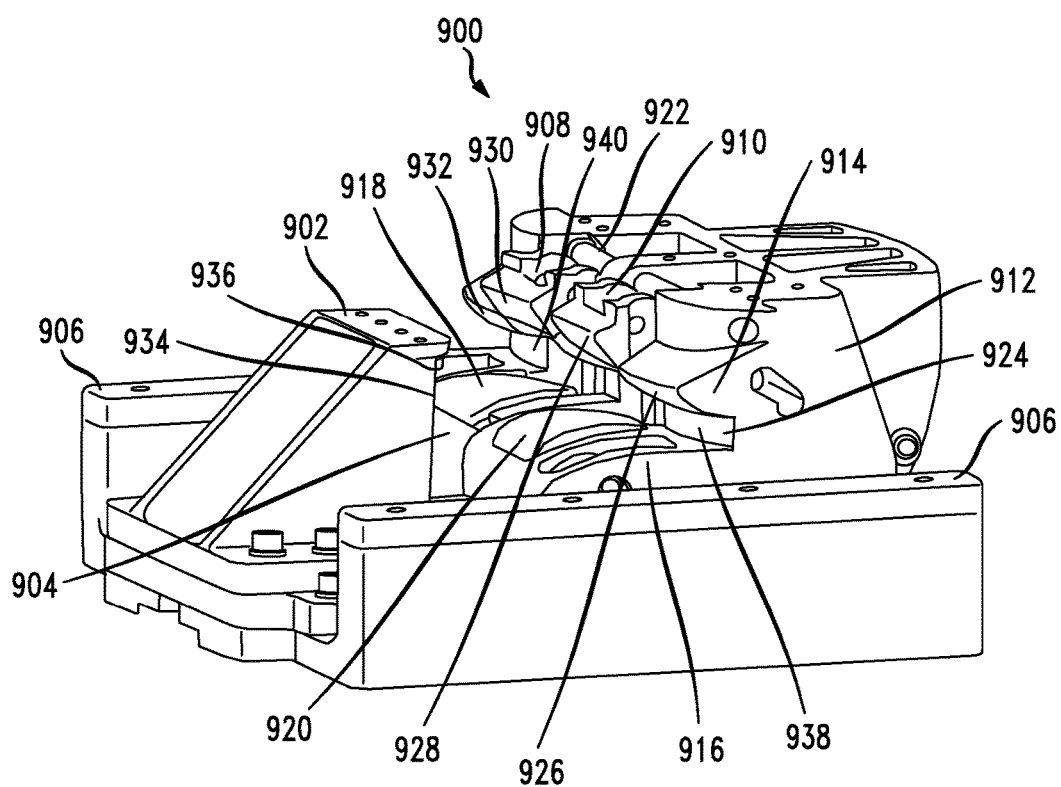
FIG. 9 illustrates a gripper possessing a single jaw pair configuration, which executes the clamp and draw-down phases of grasping as two separate actions.

FIG. 9 illustrates a single jaw pair configuration 900 for one aspect of this disclosure. There are four different aspects discussed herein but it will be readily apparent to those skilled in the art that additional embodiments not explicitly depicted are possible, all of which fall under the scope of the disclosure.

The gripper 900 as shown in FIG. 9 in the single jaw pair configuration is the terminus of a robotic system consisting of one or more robotic arms equipped with a tool drive or end effector including an input actuator to the gripper as well as the structural, power and data link between the gripper and the robotic arm. These components are ancillary to the structure of the gripper 900 and thus not shown.

The gripper 900 generally consists of one or more pairs of jaws 902, 912 which are driven by an internal transmission. The transmission receives input torque from the end effector and converts the torque to appropriate motion of the jaws. The jaws 902, 912 are designed with a conformable geometry 904, 916, 914, 924, 936 which allows the same gripper to interface to all spacecraft separation rings commonly used with Atlas V and Delta IV launch vehicles. See FIGS. 4 and 5. For example, the robotic gripper can be configured to gasp interfaces associated with any of the following spacecraft separation ring geometries: a. Atlas V Type A/Delta IV Type 937-4/5 (37.215" ring); b. Atlas V Type B & B1/Delta IV Type 1194-4/5 (47.835" ring); and c. Atlas V Type D/Delta IV Type 1666-4/5 (65.594" ring).

In a preferred aspect of this disclosure, the jaw pair consists of an outboard jaw 912 and an inboard jaw 902. The outboard jaw 912 interfaces to the outside diameter (OD) 218 of the Marman ring 210. The inboard jaw 902 interfaces to the inside diameter (ID) 226 of the Marman ring 210. The outboard and inboard jaws 912, 902 are disposed within the gripper chassis at a distance initially suitable to permit the cross-sectional thickness of the Marman ring 210 to penetrate between the jaws prior to grasping. The upper portion of the gripper chassis comprises a palm feature 906 against which the jaws draw the separation surface of the Marman ring after the ring has been captured within the jaws.

When capturing a client, the jaws 902, 912 execute a clamp-draw-down motion. The first phase of motion drives the jaws 902, 912 together to clamp the Marman ring across its OD and ID surfaces 218, 226; the OD and ID surfaces 218, 226 are restrained between opposing faces 934, 924 of the outboard and inboard jaws, respectively. The damp phase establishes sufficient preload between the jaws so as to fully captivate the Marman ring 210, but only two translations and one rotation of the client are explicitly constrained at this point. The second phase of motion is a draw-down during which the outboard and inboard jaws 902, 912 translate in synchronization toward the palm feature 906, clamping and preloading the Marman ring's upper and lower surfaces between corresponding features of the jaws and the palm 906. At the conclusion of this motion, the remaining translation and two rotations of the Marman ring 210, and thus the Client, are explicitly constrained by the outboard jaw-inboard jaw-palm triad. Preload is simultaneously applied in two directions—1) horizontally across the OD-ID surfaces 218, 226 of the Marman ring 210, and 2) vertically to hold the Marman ring 210 rigidly against the palm 906. In an alternate aspect, the palm surfaces 906 may be elevated with respect to the jaws in order to establish the vertical preload, instead of drawing the jaws down toward the palm; the end result is identical and the difference between the two grasping sequences lies merely in how the drive transmission imparts motion to the gripper elements.

The clamping and draw-down motions, coupled with the geometry of the outboard jaw 912 and inboard jaw 902, permits the gripper 900 to self-correct translational and roll, pitch & yaw misalignments between the client and servicer. These corrections occur in two ways: 1) the geometry of the jaws 902, 912 exerts forces and torques on the client that reorient the client correctly as the jaws close; and 2) the same forces and torques are registered by the robotic compliance controller and the robot arm actively moves the gripper 900 around the profile of the Marman ring 210 to bring the gripper 900 into correct orientation with respect to the client. The use of robotic compliance control attenuates the accelerations that am induced into the client during jaw closure. From the frame of reference of an observer on the client, the gripper is observed to "crawl around" the profile of the Marman ring 210 as it corrects its orientation. From an inertial frame of reference, how much the client is moved by the gripper relative to how much the robotic ant moves the gripper 900 around the client depends on the stiffness and damping parameters programmed into the robotic compliance algorithm. The gripper is also compatible with a capture scenario in which robotic compliance control is not used.

In a preferred embodiment, the inboard jaw 902 and outboard jaw 912 are coupled to the gripper drive mechanism by a linkage or other mechanical element that converts the torque input from the end effector to a two-stage linear motion. The first stage of motion consists of a linear movement of the jaws toward each other in a direction parallel to the palm 906. This motion can be thought of as the damping motion that squeezes the Marman ring 210 between the jaws 902, 912. The second stage of motion is a draw-down which rigidizes the captured Mamma ring against the palm 906. In a preferred aspect, both jaws translate downward toward the palm 906 during the draw-down phase.

In an alternate embodiment, the inboard jaw 902 is mounted to the chassis in such a way as to constrain five degrees of freedom of the jaw's motion, thus permitting only linear motion of the inboard jaw in a direction normal to the palm 906 to permit the jaw to follow the outboard jaw 912 during the draw-down phase of gripping. The motion is afforded by, as an example, a ball spline mounted rigidly within the Chassis. The fixity with which the inboard jaw 902 is mounted in the alternate embodiment provides a direct load path for the clamped reaction loads to transfer into the gripper chassis and reduces the total number of moving parts in the mechanism. In this aspect, only the outboard jaw 912 moves and drives against the static inboard jaw during the clamp phase.

The single jaw pair configuration of FIG. 9 can also be deployed in a dual jaw pair configuration as well as a single outboard jaw and a dual inboard jaw configuration.

A cross-section through the inboard jaw or side view of the inboard jaw 902 taken in a plane normal to the palm 906 and parallel to the direction of clamping reveals a small draft angle which encourages the ID 226 of the Marman ring 210 to slide down, toward the palm, when the jaws are driven together. The inboard jaw 902 also includes a ramped tooth 904 which extends slightly proud from the palm surface. The tooth encourages the ID 226 and the inner diameter flange 214 of the Marman ring to lift away from the palm 906, against the inboard jaw's cylindrical clamp surface, and lock in place underneath an upper lip 936.

The draft and the tooth simulate a V-guide into which the ID of the Marman ring is coaxed during the clamp phase of gripping. These features work together to correct the orientation of the Marman ring 210 to within a range that is acceptable at the initiation of the draw-down phase. At the top of the inboard jaw 902 is a small lip 936 which wraps around the upper surface of the inner diameter flange 214 of the Marman ring 210. The lip is relatively small and unobtrusive so as not to interfere with the insulation 208 that may be present on the upper surface of the inner diameter flange 214. As such, it is sufficient to capture the Marman ring during the clamp phase and structurally robust enough to bear the draw-down preload against the gripper palm 906. The lip is disposed at an angle relative to the inboard jaws cylindrical surface; this angle serves the same purpose as the draft of the cylindrical surface. The angled surface helps draw the Marman ring down into the capture zone of the jaw during clamp-up.

One embodiment of the inboard jaw 902 includes a deployable draw-down hook that penetrates the insulation 208 that runs from the inner diameter flange 214 of the Marman ring 210. This hook provides a more robust element to draw the inboard side of the Marman ring 210 against the palm 906 than the lip of the inboard jaw alone. Though it is driven by the gripper's primary transition, the draw-down hook is synchronized such that it does not deploy until adequate clamp preload has been established between the outboard and inboard jaws. This ensures that the client is at least partially restrained before attempting to penetrate the insulation 208. By restraining the client with a clamp preload before cutting through the insulation 208 to reach over the separation spring flange, the design of the gripper assures that the resistance due to cutting will not interfere with the robotic compliance control that will likely be active during grasping. If insulation 208 penetration were to be performed during the clamp phase of grasping, the force/torque sensor (if the robotic arm would register the resultant forces of cutting and the compliance algorithm may direct the arm in such a way that causes a missed or incomplete grasp. Therefore, the gripper ensures positive control—and a circular load path where the forces registered by the robot arm do not affect the compliance controller—before attempting insulation cutting.

A cross-section through the outboard jaw 912 taken in a plane parallel to the palm 906 reveals a compound revolute geometry of the surface 924, 938, 940 which makes contact with the OD 218 of the Marman ring 210. The compound revolute consists of a concave surface disposed between two convex surfaces 938, 940 in order to approximate the two contact cylinders 804 and 806 described in FIG. 8. This geometry can additionally be seen in FIG. 10A and FIG. 10B in jaw 1004. In a preferred aspect, the radius of the inboard jaw 902 can be selected such that it is slightly less than half of the ID 226 of the smallest Marman ring that the gripper 900 will capture. This ensures that for any client Marman ring 210, the inboard jaw 902 will contact the ID 226 at only one point. The concave radius of the outboard jaw clamping surface 924 is likewise selected such that it is slightly less than half of the OD 218 of the smallest Marman ring that the gripper 900 will capture. This ensures that for any Marman ring 210, the outboard jaw 912 will contact the OD 218 at two points 938 and 940. The main concave radius transitions to the contact zones 938 and 940 situated at opposite ends of the main clamping surface 924 and disposed symmetrically with respect to the central plane of motion of the jaws. The areas of contact 938 and 940 on the outboard jaw 912 feature large convex radii of curvature in order to minimize contact stresses between the outboard jaw 912 and the OD 218 of the Marman ring 210.

In this way, the design of the jaw pair produces a clamping contact pattern which approximates three cylinders as is depicted schematically in FIG. 8. One cylinder 802 is formed by the inboard jaw 902, and two of the cylinders 804, 806 are formed by the contact zones 938, 940 of outboard jaw 912. The cylinders 802, 804, 806 affect a three-point contact against the Marman ring 210 during the clamp phase. The single cylinder 802 contacts the ID surface 226 of the Marman ring 210, while the dual cylinders 804, 806 contact the OD surface 218. The set of reaction forces produced by this gripping geometry is not over-constrained, thereby ensuring that loads are distributed into the gripper 900 in a repeatable and predictable fashion.

In an alternate preferred aspect of this disclosure, the three-point contact 800 is reversed, where the inboard jaw contacts the Marman ring ID 226 at two points and the outboard jaw contacts the OD 218 at one point. In this aspect, the radius of the inboard jaw 902 is selected so that it is slightly larger than half of the ID 226 of the largest Marmara ring 210 that the gripper 900 will capture. Similarly, the radius of the outboard jaw 912 is selected to be slightly larger than half of the OD 218 of the largest Marman ring 210 that the gripper will capture.

Returning to the outboard jaw 912, a cross-section taken in a plane normal to the palm 906 and parallel to the direction of clamping reveals upper and lower lead-in surfaces, the upper surfaces being indicated by 926, 928, 930 and 932, and the lower surfaces being indicated by 916, 918 and 920. Each of these surfaces possesses a cam profile which has been selected to guide the OD flange 230 of the Marman ring into the clamping surface 924 of the outboard jaw 912. In order to help guide the OD flange 230 into place, the upper lead-in surfaces 926, 928, 930, 932 feature at their respective leading edges an aggressive lead-in angle relative to the palm 906, up to 60°; the surfaces 926 and 932 gracefully transition as they sweep toward the clamping surface 924 to a 15° angle that matches the profile of the Marman ring interface surface 220 on the outer flange 230. Lead-in surfaces 928 and 930 are arranged at a higher elevation than surfaces 926 and 932 relative to the palm 906 and comprise the undersides of retractable guide tangs 910 and 908, respectively. These angled surfaces exert a downward reaction against the Marman ring that is used during draw-down to the palm 906. The force vectors resulting from contact between the Marman ring and the cam profiles cause the orientation of the Marman ring to be corrected as it is drawn into the receiver. The 15° surfaces of lead-ins 926 and 932 are configured to contact and exert downward force on the angled Marman ring flange surface 220 at two points, analogous to the configuration of the clamping surface. On each side of the outboard jaw 912, the clamp contact point and drawdown contact point both lie in a plane situated normal to the palm 906 and parallel to the direction of clamping motion. In this way, neither the clamping or draw-down surfaces of the outboard jaw 912 are over-constrained when the grasp is completed.

The shapes of the upper lead-ins 926, 928, 930, 932 are truncated in a way that allows them to interface correctly to a variant of the Atlas V Type A/Delta IV Type 937-4/5 Marman ring. This variant, unlike others, possesses an outer cylindrical web 228 that is approximately the same diameter as the OD 218. Essentially, this ring is notched to permit the shoes of the Mal Evan hand to reach over the 15° flange. Other Marman ring designs feature a substantially cylindrical web 228 that begins at the root of the 15° flange. In this way, the specific variant of the Atlas V Type A/Delta IV Type 937-4/5 ring possesses the most restrictive outer diameter profile in the range of rings with which the gripper will interface.

Analogous to the upper lead-in surfaces 926, 928, 930, 932 is a lower lead-in surface 916 which is similarly configured to guide the bottom of the Marman ring OD flange 230 into engagement with clamping surface 224. The lower lead-in surface 916 features relief pockets which are occupied by pressure pads 918, 920. The pressure pads feature a cam profile on their outward-facing surfaces and are pivotally mounted to the outboard jaw such that they may rotate into the jaw body in order to accommodate the varying thicknesses of the different Marman rings with which the gripper 900 must be compatible. The pivoting motion of the pressure pads 918, 920 is biased by a spring which maintains the pressure pads in a configuration such that their cam surfaces sit substantially proud of the profile of the lower lead-in surface 916. The springs cause the pressure pads 908, 910 to exert an upward force on the Marman ring OD flange 230 via the separation surface 222, forcing the angled flange 220 into the upper lead-in surfaces 926, 932, while still allowing the pressure pads to articulate and conform to the shape of the Marman ring 210 as it enters the clamping zone of jaw 912.

The clamping surface 924 of the outboard jaw 912 is sized to be slightly taller than the thickness of the Marman ring having the thickest OD flange 230 out of the range of potential Marman rings that the gripper will capture. Therefore, more thinly-flanged Marman rings will possess a degree of vertical float within the female receiver 924 during the clamp-up phase. In order to ensure a repeatable set of initial conditions when the gripper 900 makes the transition from clamping to draw-down, the pressure pads 918, 920 reduce the effective thickness of the clamping zone by penetrating into that area in such a way that, at their relaxed position, the effective height of the clamping zone is actually the thickness of the thinnest OD flange that is expected to be captured. A thicker Marman ring pushes the pressure pads 918, 920 out of the way as it enters the zone and translates toward the clamping surface 924. As they are spring-loaded, the pressure pads 918, 920 exert a force that encourages the upper 15° flange surface 220 to maintain contact with the corresponding lead-in surfaces 926, 932 of the outboard jaw 912. In this way, the entire range of Marman rings that may be captured with the gripper enter into the draw-down phase with the 15° flange surface 220 in contact with the upper lead-in surfaces 926, 932 of the outboard jaw 912, regardless of flange 230 thickness.

Furthermore, the pressure pads 918, 920 assist the robotic compliance controller in correcting the orientation of the gripper by communicating their respective spring preloads to the robotic arm's force/torque sensor. As the pads are depressed, the developed spring force is registered by the compliance controller. Because the spring force is relatively constant, it provides more stable feedback to the compliance controller than a "hard" lead-in—the bouncing around of a Marman ring profile between hard lead-in surfaces generates rapid impulses that may be ignored by the compliance controller's filter. The stiffness of the pressure pad springs is selected to be compatible with the stiffness(es) of the robot arm joints when the robot arm is operating under compliance control so as not to induce instability in the closed-loop control of the robot arm.

To extend the reach of the gripper relative to the palm 906 and provide a more forgiving range of capture in the direction normal to the palm the outboard jaw 912 may equipped with two guide tangs 908, 910 which essentially continue the cam profile of the upper outboard jaw lead-ins 926 and 932 via surfaces 928 and 930. The side effect of increasing vertical reach of the outboard jaw is an extension of the upper lead-in that would interfere with the outboard surface of the web 228 of the captured Marman ring 210. Therefore, the tangs 908, 910 are mounted on a breakaway mechanism. Each tang 908, 910 is pivotably received into a link, which in turn is received at its opposite end onto a pivot pin mounted in the outboard jaw 912. The tang end of the link is in further communication with the outboard jaw via two spring struts, one end of which is pivotally received between the tang and link, and the other end of which pivotally pinned to the outboard jaw. The spring struts urge the link to remain at its most elevated position. The upper surface of each tang 908, 910 is a cam profile that is disposed against a breakaway bar 922, mounted transversely through the outboard jaw 912. The tangs 908, 910 are encouraged to rest against the breakaway bar 922 by means of an array of torsion springs whose legs are disposed between corresponding features in the tang and link. In the relaxed condition, the link is forced upright by the spring struts and the tangs 908, 910 are further forced up against the breakaway bar 922 by the torsion springs.

When a force is applied to the underside lead-in surfaces 928, 930 of the tangs 908, 910 as a result of encountering a Marman ring 210 during grasping, the tangs 908, 910 behave as a rigid lead-in, guiding the OD flange 230 of the Marman ring 210 into the outboard jaw's clamping surface 924. The upper cam profile of the tangs 908, 910, along with the position of the breakaway bar 922, are selected such that as soon as the reaction force vector's direction becomes parallel to the palm (for example, when the tang edge is contacted by the outer surface of the web 228), the tang 908, 910 disengages from the breakaway bar 922. Continuing to push on the tang 908, 910 in a direction parallel to the palm 906 causes the link to retract against the spring struts. The push is provided by the clamping motion of the outboard jaw 912 against the Marman ring 210, with the net result being that the tangs 908, 910 drop away into the body of the outboard jaw 912. The shape of the tangs 908, 910 is further selected such that they will not begin to drop away until the OD flange 230 of the Marman ring 210 has sufficiently entered the clamping zone, ensuring that the Marman ring cannot escape the outboard jaw 912. Additionally, the resistance against the Marman ring created by the spring struts results in a force that tends to hold the ID 226 of the ring against the inboard jaw 902 and under its lip 936, reducing the risk that the ring will bounce out of the pocket formed by the inboard jaw 902 upper lip and lower lead-in tooth 904.

One embodiment of the palm 906 consists of two solid rails, one on either side of the outboard jaw 912, whose upper surfaces are parallel to the separation surface of the Marman ring. During the draw-down phase, the outboard jaw 912 and inboard jaw 902 squeeze the separation surface 222 against the palm rails 906 and in so doing, correct rotational misalignments of the Marman ring 210 that are in a plane normal to the palm and parallel to the clamp direction. The rigid palm rails 906 provide a direct load path from the Marman ring 210 into the chassis of the gripper, and thus into the robotic arm.

An alternate embodiment of the palm 906 can include an array of roller-rockers mounted into the gripper chassis. The array is disposed in such a way so as to approximate a curve which mimics the curve of the separation surface 222 when looking down on the palm 906 from above. The roller-rockers are pivotally received into the chassis through a central revolute joint, on either side of which is a short arm terminating in either a roller or a cam surface. The array of roller-rockers provides conformability of the palm 906 to both the separation surface 222 and underside of the inner diameter flange 224 of the Marman ring 210. All Marman rings with which the gripper 900 will be expected to interface possess a relieved separation surface 222 with an elevated step 224 as the surface extends from the OD 218 to the ID 226.

As the Marman ring 210 is drawn down against the palm, the OD side of the separation surface 222 first contacts the rollers positioned closest to the outboard jaw. As draw-down continues, the outboard-side rollers are pushed down, elevating the inboard-side rollers up against the relieved surface 224. When the reaction forces against the two sides equalize the moment about the roller-rocker pivot, the draw-down is rigidized.

A third embodiment of the palm consists of a series of stepped rails 906 on either side of the jaws 902, 912. Each rail 906 corresponds to a different separation surface geometry among the range of potential Marman rings 210 that the gripper 900 will capture. During the clamp phase, one of the rails 906 (three on each side of the outboard jaw) is rigidly locked relative to the gripper chassis. The locked rail 906 corresponds to the Marman band 210 with the largest profile width (largest distance between OD 218 and ID 226). As the jaws move through their clamp stroke, a mechanism selectively locks and unlocks the appropriate rail, since different profile widths of the Marman ring 210 will result in different final positions of the jaws during the clamp phase. For example, if the jaws are driving against a Marman ring 210 with a smaller profile width, as soon as the outboard jaw 912 passes the position corresponding to the width of the largest profile, a feature on the outboard jaw 912 will unlock, the initially locked palm rail set and engage another set. The unlocked palm rails are free to drop away into the gripper chassis so as not to interfere with the draw-down phase. Upon release of the client, when the jaws are driven back to their fully open position, the palm rails are reset to initial conditions.

The gripper drivetrain may include a toggle mechanism which locks the outboard jaw 912 and inboard jaw 902 in place by driving over-center. The toggle mechanism is unique in that it is designed to achieve the over-center position regardless of the shape and size differences of the potential Marman rings with which the gripper interfaces. This mechanism guarantees a minimum preload in both the clamp and draw-down directions, and also prevents the drivetrain from backdriving after the grasp is complete.

After completing the clamp and draw-down of the Marman) ring 210, the path through which forces and torques from the robotic, arm to the client are transmitted must travel through the drivetrain components of the gripper, which may include multiple revolute joints and thin links. Such a load path, though capable of generating high clamp preload as described above, is not necessarily stiff enough to meet the requirement for the first fundamental frequency of the client/servicer stack. Therefore, the gripper may feature an alternate mechanism which redirects the load path to bypass the drivetrain and dump loads generated by the servicer attitude control system directly into the chassis of the gripper. This could be accomplished, for example, by a set of wedge blocks which are driven by a secondary mechanism, operated independently of the jaw transmission. The wedge blocks are in direct communication with the gripper chassis via dovetail slots, rectangular keyways, or other common guideway forms. One block engages a spherical surface on the back side of the outboard jaw 912, while the other block contacts a similar spherical surface on the back side of the inboard jaw 902. In this way, reaction loads transmitted from the Marman ring travel through the structure of the active and inboard jaws, passing into the wedge blocks and then into the gripper chassis. This load path exhibits a much higher stiffness than the path which traverses the drivetrain, boosting the fundamental frequency of the grasped client/servicer system.

In order to provide a redundant means of ensuring that the grasping mechanism cannot backdrive and relieve the grasp preload against the client, the gripper may be equipped with an anti-rotation device (ARD) which engages both the jaw drivetrain and, if present, the wedge block drivetrain or similar load bypass drivetrain. As an example embodiment, after the grasp has been rigidized, an additional actuator in the end effector causes the teeth of the ARD to come into communication with corresponding sets of teeth on each of the jaw drive and wedge drive input shafts. Prior to release of the client, the end effector retracts the ARD which frees the input shafts to transmit torque to their respective drive elements.

The gripper can feature an array of sensors providing feedback to the robotic control system for triggering the grasp and for determining when the grasp is complete. Grasp triggering may be performed with 1) contact-based sensing, in which case the robot arm force/torque sensor is adequate to trigger the grasp, 2) optical sensing, in which light arrays are arranged across from each other on the outboard and inboard jaws and breaking the beams indicates that the Marman ring has sufficiently penetrated the jaws to initiate the grasp, 3) distance sensing, in which a laser ranger, capaciflector array or some other sensor arrangement triggers the grasp by measuring the distance of the Marman ring separation surface 222 relative to the gripper palm 906, or 4) a combination of one or more of the above methods or concepts. Sensing of grasp completion can be performed by use of limit switches that register when an end-of-travel feature of the jaw drivetrain has engaged.

The quality of the grasp can be sensed by strain gages or other force-sensing elements embedded in the palm and which provide direct feedback on the preload value that was achieved during the grasp. The same force sensing elements may be used to sense slipping or shifting of the grasped position throughout the duration of the servicing sortie.

The gripper described herein may be furnished in a variety of different configurations, several of which are described as follows.

A preferred aspect, shown in FIG. 9, in which the gripper is comprised of a single pair of jaws, and in which both the outboard and inboard jaws are driven toward one another during the clamp phase of capture (resembling the traditional motion of industrial parallel-jaw grippers).

An alternate aspect, similar to FIG. 9, can include a gripper comprised of a single pair of jaws, in which the inboard jaw 902 is fixed to the chassis during the clamp phase of capture and possesses a single degree of freedom normal to the palm 906 which allows it to follow the outboard jaw during the draw-down phase.

In another alternate aspect, the gripper can include two pairs of jaws, each pair consisting of one outboard jaw and one inboard jaw. The jaw pairs are offset from one another by a specified distance to increase the grasping footprint of the gripper. Each jaw pair resides in a module which is pivotally received into the gripper chassis by means of turntable bearings. In this way, each jaw module is afforded an independent degree of rotation which allows the jaw pairs to conform to the variation in diameters of the range of client Marman rings. In order to prevent over-constraint of the Marman ring, the jaw modules are driven through a differential, Whiffletree linkage, or other compliant mechanism which splits the input torque to each module. The use of compliance between the jaw pairs, whether by joints or differential geartrain, ensures that when one module reaches its final position, the second module continues to drive to full closure, and only then are the clamping and draw-down preloads equalized between the jaw pairs. In this embodiment, both the outboard and inboard jaws are driven toward one another during the clamp phase of capture.

In another alternate aspect, the gripper includes two pairs of jaws, each pair consisting of one outboard jaw and one inboard jaw, and in which the inboard jaws are fixed to their modules during the clamp phase of capture.

In another alternate aspect, the gripper includes one outboard jaw and two inboard jaws, the inboard jaws being offset from one another by a specified distance to increase the grasping footprint of the gripper. In this embodiment, both the outboard and inboard jaws are driven toward one another during the clamp phase of capture.

In yet another alternate aspect, the gripper includes one outboard jaw and two inboard jaws, and in which the inboard jaws are fixed to the chassis during the clamp phase of capture, and possess a single degree of freedom normal to the Palm which allows them to follow the outboard jaw during the draw-down phase.

In yet another alternate aspect, the gripper includes two outboard jaws and one inboard jaw, the outboard jaws being offset from one another by a specified distance to increase the grasping footprint of the gripper. In this embodiment, both the outboard and inboard jaws are driven toward one another during the clamp phase of capture.

In yet another alternate aspect, the gripper includes two outboard jaws and one inboard jaw, and in which the inboard jaw 902 is fixed to the chassis during the clamp phase of capture, and possesses a single degree of freedom normal to the palm which allows it to follow the outboard jaws during the draw-down phase.

Other features of the gripper 900 are as follows. The gripper 900 can possess an underactuated draw-down mechanism which transitions the motion of the jaws from horizontal (parallel to the palm) to vertical (normal to the palm). The mechanism executes both motions being driven by a single input actuator. The motions are synchronized such that the transition to draw-down movement cannot occur until a threshold preload has been established in the clamping direction, The full sequence of motions actuated by a single drive input are as follows: drive the outboard jaw horizontally against inboard jaw until threshold clamp preload has been established, maintain clamp preload, shift motion of jaws to vertical direction and pull both the outboard jaw 912 and inboard jaw 902 toward the palm 906, drawing the separation surface 222 and stepped surface 224 of the Marman ring 210 up against the palm 906.

The gripper 900 can include a structure in which both the outboard and inboard jaws are suspended on pivoting links that are attached to a sub chassis. The pivoting links are driven at their opposite ends by a set of intermediate links which are in turn connected to a screw mechanism. The advance of the screw mechanism causes the jaw ends of the links to pivot toward one another. Both jaws are maintained parallel to one another by means of a four-bar backing linkage that rotates with the pivoting main links. The geometry of the links is chosen such that the intermediate links are nearly perpendicular to the axis of the screw when the Marman ring is clamped, resulting in a significant three multiplication. Furthermore, once the intermediate links are driven over-center, the nut encounters a hard stop on the sub-chassis. The sub-chassis is suspended within the main gripper chassis; as the screw continues to drive, it lowers the sub-chassis within the main chassis, drawing the jaws down against the palm feature which resides at the top of the main chassis.

The gripper 900 can also include features such as serrations or knurling on the contact surfaces of both outboard and inboard jaws 912, 902 to complete a rigid grasp through soft materials (e.g., thermal insulation or beta cloth tape). The gripper 900 can gracefully equalize electrical potential between the servicing spacecraft and the client through use of selective insulation and a bleed resistor and can include a two-fault tolerance against inadvertent release or back-driving of the grasping mechanism. The two-fault tolerance can also work against the inability to release the client when the servicing sortie is complete.

The gripper 900 can include a differential mechanism, such as a Whiffletree linkage as would be known to those of skill in the art, to 1) permit differential vertical motion between the outboard jaw 912 and inboard jaw 902 during the draw-down phase of grasping, and 2) equalize, the vertical clamp force between the outboard, jaw 912 and inboard jaw 902 at the end of the grasp.

The gripper 900 can also include a toggle mechanism which locks the outboard and inboard jaws 912, 902 in place by driving over-center and which possesses the capability to achieve the over-center position regardless of the shape and size differences of the potential Marman rings with which the gripper interfaces.

The gripper 900 can include a set of wedge blocks or similar features which are driven by a secondary mechanism into engagement with surfaces on the back sides of the outboard and inboard jaws 912, 902, the purpose of which being to redirect the load path to bypass the drivetrain and dump loads generated by the servicer attitude control system directly into the chassis of the gripper 900.

The gripper 900 can include an anti-rotation device (ARD) (not shown) which engages both the jaw drivetrain and the wedge block drivetrain in order to prevent back-driving and loosening of the grasp.

The gripper 900 can include an array of sensors providing feedback to the robotic control system for triggering the grasp and for determining a) when the grasp is complete, b) the preload generated during the grasp, and c) whether the grasp is slipping or changing over the duration of the servicing sortie where the servicer is mated to the client.

The gripper 900 can also include a palm feature consisting of two solid rails, one on either side of the gripper chassis, whose upper surfaces are parallel to the separation surface 222 of the Marman ring 210.

The gripper 900 can include a palm feature 906 consisting of an array of roller-rockers mounted into the gripper chassis, the array being disposed in such a way so as to approximate a curve when looking down on the palm from above, and in which the roller-rockers are pivotally received into the chassis through a central revolute joint, on either side of which is a short arm terminating in either a roller or a cam surface. The gripper 900 can include a palm feature 906 consisting of three stepped rails on either side of the gripper chassis, each pair of which corresponding to the separation surface geometry of a particular Marman ring, and each pair of which is individually locked to, or unlocked from, the gripper chassis depending on the position of the jaws in their travel stroke.

The gripper 900 can include all abilities enumerated above, in which both the outboard and inboard jaws are driven toward one another during the clamp phase of capture, or in which the inboard jaw is fixed relative to the gripper chassis and only executes motion normal to the palm during the draw-down phase.

In one aspect, the gripper 900 as described in any variation above, can include the palm feature as described above or any of the actuation methods described above.

The gripper 900 can include all abilities enumerated in above, in which the gripper includes two pairs of jaws, each pair consisting of one outboard jaw and one inboard jaw. The jaw pairs are offset from one another by a specified distance to increase the grasping footprint of the gripper. Each jaw pair resides in a module which is pivotally received into the gripper chassis by means of turntable bearings. The jaw modules are driven through a differential which splits the input torque independently to each module, in this embodiment, the inboard jaws are fixed to their modules during the clamp phase of capture. Such a version of the gripper 900 can also include the palm feature and can perform the actuation method describe above. The radii of the active and inboard jaws can be modified to produce a contact pattern described above, Both the active and inboard jaws can be driven toward one another during the clamp phase of capture. The gripper can include one outboard jaw and two inboard jaws, the inboard jaws being offset from one another by a specified distance to increase the grasping footprint of the gripper. The inboard jaws are fixed to the chassis during the clamp phase of capture, and possess a single degree of freedom normal to the Palm which allows them to follow the outboard jaw during the draw-down phase.

An alternate embodiment, the gripper 900 can include one outboard jaw and two inboard jaws, and in which both the Active and Inboard jaws are driven toward one another during the clamp phase of capture. Such a gripper 900 can include the palm feature and the actuation features described here. The gripper 900 can include all abilities enumerated above, in which the gripper is comprised of two outboard jaws and one inboard jaw, the outboard jaws being offset from one another by a specified distance to increase the grasping footprint of the gripper. The inboard jaw is fixed to the chassis during the damp phase of capture, and possesses a single degree of freedom normal to the Palm which allows it to follow the outboard jaws during the draw-down phase.

The gripper 900 may include any or all of the abilities enumerated above, in any combination or variation thereof, and remain within the scope of this disclosure.

Any of the features described herein relative to the gripper 900 can also apply to the alternate preferred embodiment of the gripper 1000 disclosed below and in FIG. 10A and FIG. 10B.

Figure 10A:
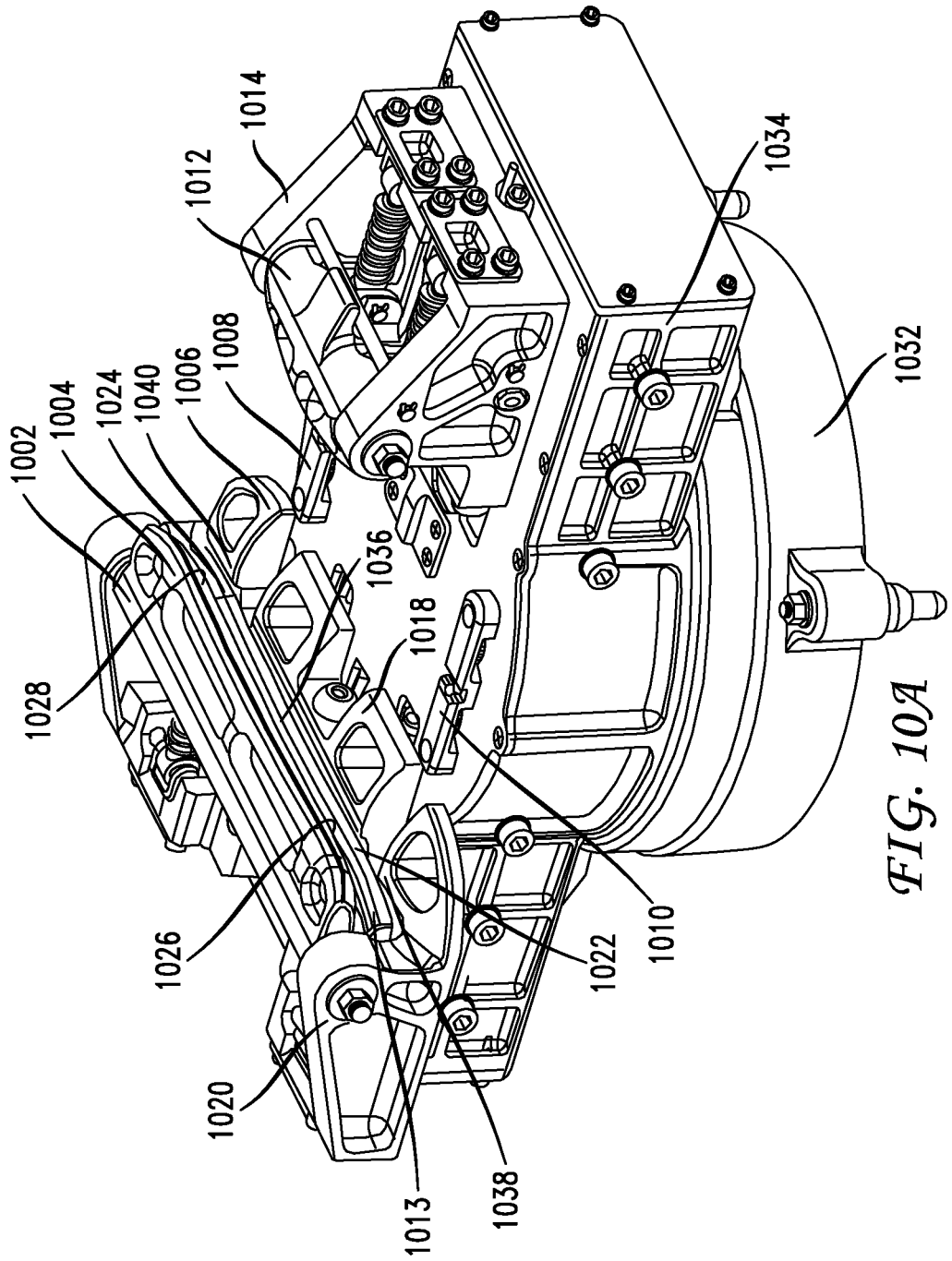
FIG. 10A illustrates a preferred embodiment of the gripper device, which executes the clamp and draw-down phases of grasping simultaneously.
Figure 10B:
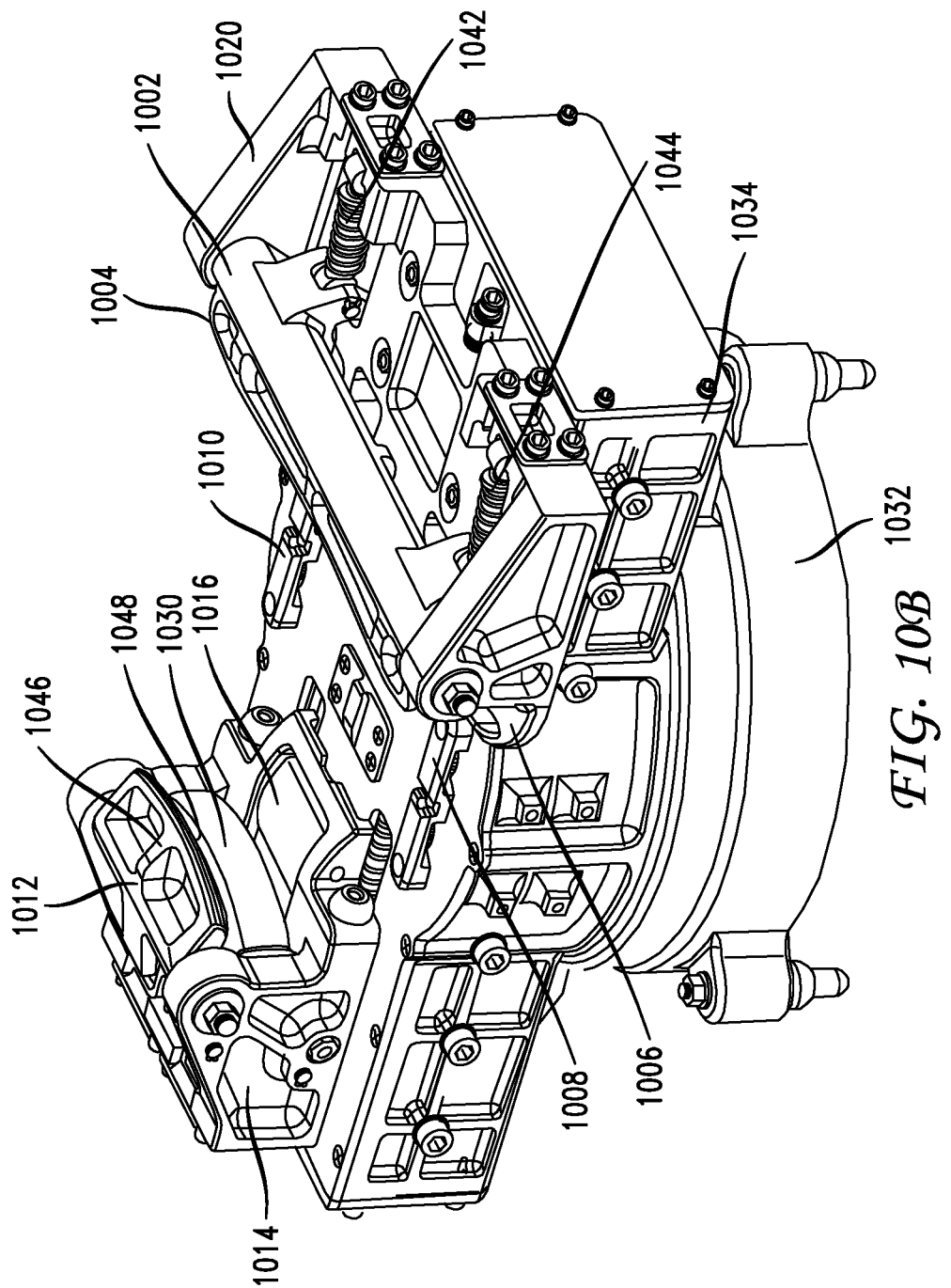
FIG. 10B illustrates another view of the gripper device.

FIG. 10A and FIG. 10B illustrate different views of an alternate preferred embodiment 1000 which has been optimized for both weight and distance of the center-of-gravity from the mounting adapter 1032 to the robot end effector. As shown in FIG. 10A and FIG. 10B, the gripper 1000 includes an outboard jaw assembly which includes a carrier 1020 and rotary jaw 1002. The rotary jaw 1002 is configured to be pivotably mounted within the carrier 1020 along an axis parallel to the palm plane and perpendicular to the jaw line of action. Likewise, the inboard jaw assembly consists of a carrier 1014 and a rotary jaw 1012, mounted in substantially similar fashion to the outboard rotary jaw 1002. Disposed symmetrically on either side of the outboard jaw chassis 1020 are two palm rails 1008, 1910 which servo a similar function as the palm surfaces 906 in gripper 900. The palm rails 1008, 1010 may be mounted directly to the outboard jaw carrier 1020, in which case they move linearly along with the carrier, or they may be affixed to either side of the gripper chassis 1034.

Gripper 1000 is configured to be compatible with either all of the referenced variations in Marman ring profiles discussed above or a subset of the profiles, or may alternately be optimized for a single Marman ring profile.

Referring to the outboard jaw assembly, the jaw carrier 1020 is mounted to a drive screw within the gripper chassis 1034 in such a way as to impart linear motion of the carrier 1020 toward the center of the chassis 1034 when the screw is driven by the robot end effector, a motor, or other motive means. Outboard rotary jaw 1002 features a lead-in protrusion 1004 which includes lead-in surfaces 1026 and 1028, which are analogous to surfaces 926 and 932 gripper 900. Similarly, rotary jaw 1002 features a clamping surface 1013 which, in cross-section parallel to the palm rails 1008, 1010, incorporates a compound curvature featuring concave surface 1036 flanked by convex surfaces 1022 and 1024. The radius of surface 1036 is selected to be less than half of the OD 218 of the smallest Marman ring 210 that gripper 1000 will be configured to grasp, which ensures that surfaces 1022 and 1024 contact the Marman ring OD 218 during clamping in a manner analogous to the two contact cylinders 804 and 806 depicted in FIG. 8. Clamping surface 1013 is also analogous to surface 924 in gripper 900.

Outboard jaw carrier 1020 also features a lower lead-in surface 1018, which may be considered an analog to the surface combination 916, 918, 920 in gripper 900. Together with upper lead-in feature 1004, the lead-ins serve to guide the OD flange 230 of Marman ring 210 into the contact zone and against clamping surface 1013 as the outboard jaw assembly is driven closed during capture.

Outboard rotary jaw 1002 is configured to be biased, by a set of springs 1042, 1044, about its rotation axis in such a way that the axes of contact surfaces 1022 and 1024 are not normal to palm plane, but rather are set back from perpendicular by a few degrees. This has the effect of rendering the rotary jaw 1002 more "open" relative to the lower lead-in surface 1018, as the distance between the leading edges of the upper lead-in 1004 and the lower surface 1018 is increased. Such a feature provides additional tolerance of misalignment between the gripper 1000 and the client Marman ring 210 prior to capture.

Referring to the inboard jaw assembly, the jaw carrier 1014 is mounted to a drive screw within the gripper chassis 1034 in such a way as to impart linear motion of the carrier 1014 toward the center of the chassis 1034 when the screw is driven by the robot end effector, a motor, or other motive means. Inboard rotary jaw 1012 features a lead-in protrusion 1046 which includes lead-in surface 1048, which is analogous to lip 936 on gripper 900. Similarly, rotary jaw 1012 features a clamping surface 1030 which, in cross-section parallel to the palm rails 1008, 1010, incorporates a radius that is selected to be less than half of the ID 226 of the smallest Marman ring 210 that gripper 1000 will be configured to grasp, which ensures that surface 1030 contacts the Marman ring ID 226 during clamping in a manner analogous to the contact cylinder 802 depicted in FIG. 8. Clamping surface 1030 is also analogous to surface 934 in gripper 900. Similar to gripper 900, a cross-section taken through the inboard jaw assembly in a plane normal to the palm rails 1008, 1010 and parallel to the line of motion of the ja carriers indicates that clamping surface 1030 is configured to possess a draft angle which tends to exert a force toward the palm rails 1008, 1010, when the inboard jaw assembly clamps the ID 226 of the Marman ring 210.

Inboard jaw carrier 1014 also features a lower lead-in surface 1016, which may be considered an analog to the surface 904 in gripper 900. Together with upper lead-in feature 1046, the lead-ins serve to guide the inner diameter flange 214 of Marman ring 210 into the contact zone and against clamping surface 1030 as the inboard jaw assembly is driven closed during capture.

Outboard rotary jaw 1012 is Configured to be biased, by one or more springs, about its rotation axis in such a way that the axis of contact surface 1030 is not normal to the palm plane, but rather are set back from perpendicular by a few degrees. This has the effect of rendering the rotary jaw 1012 more "open" relative to the lower lead-in surface 1016, as the distance between the leading edges of the upper lead-in 1046 and the lower surface 1016 is increased. Such a feature provides additional tolerance of misalignment between the gripper 1000 and the client Marman ring 210 prior to capture.

Lower lead-in surface 1016 is configured on an articulating component which is pivotally disposed within the gripper chassis 1000 and is not integral to the inboard jaw assembly. Features on the inboard jaw carrier 1014 are selected in such a way as to alter the height of the lower lead-in 1016 relative to the rotary jaw 1012 as the inboard jaw carrier 1014 moves through its stroke. In this way, the distance between upper and lower lead-ins is determined by the position of the inboard jaw carrier 1014. The lead-in separation distance is selected to correspond to a particular profile of a Marman ring inner diameter flange 214 based on the separation of the inboard and outboard jaws, such that when the jaws are driven closed to clamp on a particular Marman ring 210 profile, the thickness of that profile will automatically induce the inboard jaw assembly to select, though positioning of the lower lead-in 1016, a separation of upper and lower lead-ins that correctly correspond to the thickness and elevation of the inner diameter flange 214 relative to the palm plane.

Referring now to the action of both rotary jaw assemblies during capture: the grasping sequence begins as the separation surface 222 of the client Marman ring 210 enters the space between retracted jaw assemblies and impacts one or both of the palm rails 1008, 1010. Gripper 1000 drive mechanism causes the jaw carriers 1020, 1014 to advance linearly toward each other. As the jaws close over the profile of the Marman ring 210, upper and lower lead-in features 1004, 1046, 1016 and 1018 correct the misalignment between the Marman ring 210 and gripper 1000, while guiding the OD flange 230 into engagement with outboard clamping surface 1013 and the ID flange 214 into engagement with the inboard clamping surface 1030.

As the gaps between Marman ring OD 218, ID 226, and clamping surfaces 1013, 1030 close, the clamping contact points 1022, 1024 of the outboard rotary jaw 1002 come into contact with OD 218; likewise, surface 1030 of inboard rotary jaw 1012 comes into contact with ID 226, and a damping preload begins to build at all of these interfaces. The clamping surfaces 1013, 1022, 1024 and 1030 are all selected such that a clamping force applied on these surfaces induces a moment about the respective rotary jaw pivot axis which tends to roll the jaw down, drawing the upper lead-in features 1004, 1046 toward the palm plane. Eventually, the clamping preload builds to a point at which the rotary jaw biasing springs are overcome, at which point the jaws 1002, 1012 begin to rotate in the fashion described above. Continued linear motion of the jaw carriers 1020, 1014 increases the clamping force, which in turn increases the induced moment about the pivot axes of rotary jaws 1002, 1012.

The outboard rotary jaw 1002 rotates down such that the upper lead-in feature 1004 makes contact with the angled flange surface 220 of the Miamian ring 210 at contact points 1026 and 1028. A reaction force develops at contact points 1026, 1028 which draws the Marman ring OD flange 230 down against reaction surfaces 1038, 1040 on either side of the outboard jaw carrier 1020. Draw-down contact points 1026, 1028 are configured to each lie in a plane normal to the palm plane, parallel to the line of motion of the jaw carrier 1020, and containing clamping contact points 1022 and 1024, respectively. In this way, clamp and draw-down contact zones are well-aligned, which maximizes the stiffness of the rotary jaw 1002 in the contact zone. It will be readily apparent that as the clamping force continues to increase, the induced moment on the rotary jaw 1002 commensurately increases, inducing increased draw-down force against surfaces 1038, 1040. In this way, clamping force simultaneously induces a draw-down force, all resulting from the single applied force of the drive mechanism on the outboard jaw carrier 1020.

In identical fashion, the inboard rotary jaw 1012 rotates down such that the upper lead-in feature 1046 makes contact with the top of the inner diameter flange 214 of the Marman ring 210 at contact point 1048. A reaction force develops at contact point 1048 which draws the Marman ring inner diameter flange 214 down against the top of the inboard jaw lower lead-in 1016, which has articulated to correctly represent the elevation difference between separation surface 222 and stepped surface 224 for the particular Marman ring profile being grasped. Draw-down contact point 1048 is configured to lie in a plane normal to the palm plane, parallel to the line of motion of the jaw carrier 1020, and containing clamping contact point 1030. In this way, clamp and draw-down contact zones are well-aligned, which maximizes the stiffness of the rotary jaw 1012 in the contact zone. As with the outboard jaw, it will be readily apparent that as the clamping force continues to increase on surface 1030, the induced moment on the rotary jaw 1012 commensurately increases inducing increased draw-down force against the lower lead-in 1016. In this way, clamping force simultaneously induces a draw-down force, all resulting from the single applied force of the drive mechanism on the outboard jaw carrier 1014.

The final grasped configuration includes six contact points: two clamp contact points 1022, 1024 on the outboard jaw 1002 and one clamp contact point 1030 on the inboard jaw 1012, as well as two draw-down contact points 1026, 1028 on the outboard jaw 1002 and one draw-down contact point 1048 on the inboard jaw 1012. The draw-down forces are reacted into the lower contact surfaces 1038, 1040 on the outboard jaw carrier and into the lower inboard jaw lead-in 1016. All contact forces are induced by the driving of the jaw carriers 1020, 1014 along the single drive screw, resulting in an extremely simple and stiff mechanism.

Since the only source of the draw-down load is the radial clamp load, the relationship between radial clamp preload and draw-down preload is direct; moreover, the instant that radial preload is removed, draw-down preload is simultaneously removed, eliminating the possibility of sticking of the Marman ring 210 within the jaws during the release of the gripper 1000.

Additionally, because the draw-down motion is effectively reduced to a squeeze, rather than a translation over some non-trivial distance, relative axial motion between the client spacecraft and gripper 1000 during the grasp event is minimized, which benefits the robot arm compliance control system.

Note that, unlike gripper 900, the palm rails 1008, 1010 do not participate in the reaction of draw-down loads like palm features 906. Rather, the draw-down forces generated in gripper 1000 are reacted directly into the lower lead-in features of the outboard and inboard jaws, surfaces 1038, 1040 and 1016.

The robotic gripper in the embodiment described above includes a feature, in which inboard and outboard jaws are mounted in rotatable fashion on respective jaw carriers, the carriers being configured to translate linearly in a fashion that drives them together, thereby imparting via the rotary jaws simultaneous clamping and draw-down motion through a single underactuated mechanism.

In another aspect, the robotic gripper is included, wherein both the inboard and outboard jaw carriers are configured to actively drive toward each other during the damping phase of grasping, and wherein both jaws execute a draw-down motion during the draw-down phase.

In another aspect, the robotic gripper includes the inboard rotary jaw which further includes a ramped tooth which extends slightly proud from the palm and encourages the inner diameter of the Marman ring to lift away from the palm, against an inboard rotary jaw contact surface.

In a further aspect, the ramped tooth can articulate relative to the inboard rotary jaw and palm in order to correctly match the variable profiles of a variety of Marman rings Which the gripper may be called upon to grasp.

In another aspect, the upper lead-in features and tooth of the inboard rotary jaw approximate a V-guide into which the inner diameter of the Marman ring is coaxed during a clamp phase of grasping.

At a top of the inboard rotary jaw, the system can provide a lead-in feature which wraps around an upper surface of an inner diameter flange of the Marman ring, and which is disposed at an angle relative to the inboard rotary jaw clamping surface to urge the Marman ring down into capture zones of the outboard jaw and inboard jaw during clamp-up.

The outboard rotary jaw can include geometric features which work together to correct an orientation of the Marman ring during grasping, the geometric features including one or more of: a face of the outboard rotary jaw which contacts the outer diameter of the Marman ring, the face comprising a compound revolute geometry including a concave surface disposed between two convex surfaces in order to establish two points of contact on the outer diameter.

The outboard rotary jaw further can further include upper and lower lead-in surfaces possessing a cam profile that guides an outer diameter flange of the Marman ring into a female receiver area and clamping surface of the outboard rotary jaw.

The upper lead-in of the outboard rotary jaw can include a 15° surface that matches a profile of a clamp band interface surface on an outer flange of the Marman ring.

A lower lead-in of the outboard rotary jaw chassis can be configured with contact surfaces to react the draw-down Threes induced by development of clamping forces.

The robotic gripper can further be configured to grasp interfaces associated with any of the following spacecraft separation ring geometries: Atlas V Type A/Delta IV Type 937-4/5 (37.215" ring); Atlas V Type B & B1/Delta IV Type 1194-4/5 (47.835" ring); Atlas V Type D/Delta IV Type 1666-4/5 (65.594" ring). Other configurations are contemplated as well.

In one aspect, the rotary jaw robotic gripper constrains all six degrees of freedom when coupled to any of the interfaces.

In another aspect the rotary jaw robotic gripper corrects, through mechanical action only or through a combination of mechanical action and robotic compliance control, an orientation of a Marman ring that is misaligned in three translational directions and in roll, pitch & yaw, simultaneously.

The location of the clamping surfaces and rotation axis of the outboard rotary jaw can be selected such that a clamping three applied on these surfaces induces a moment about the respective rotary jaw pivot axis which tends to roll the jaw down, drawing the upper lead-in features toward the palm plane and into contact with the upper clamp band interface surface of the Marman ring.

The draw-down forces induced on the Marman ring by the outboard rotary jaw can arise solely from motion of the rotary jaw, induced by clamping forces, and are applied simultaneously with these clamping forces.

The location of the clamping surface and rotation axis of the inboard rotary jaw can be selected such that a clamping force applied on this surface induces a moment about the respective rotary jaw pivot axis which tends to roll the jaw down, drawing the upper lead-in features toward the palm plane and into contact with the upper surface of the inner diameter flange of the Marman ring.

The draw-down forces induced on the Marman ring by the inboard rotary jaw can arise solely from motion of the rotary jaw, induced by clamping forges, and are applied simultaneously with these clamping forces.

It will be readily apparent that any of the alternate jaw arrangements described with regard to gripper 900 may also be implemented for gripper 1000, including an embodiment with dual jaw pairs, an embodiment with a single outboard jaw assembly and dual inboard jaw assemblies, an embodiment with dual, outboard jaw assemblies and a single inboard jaw assembly, and other conceivable embodiments not specifically disclosed but which utilize the same rotary jaw architecture.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A robotic gripper for rigidly grasping a section of a Marman ring, the robotic gripper comprising:
   an outboard jaw which interfaces to an outer diameter side of the Marman ring having an outer diameter;
   an inboard jaw which interfaces to an inner diameter side of the Marman ring having an inner diameter; and
   a palm which interfaces to a separation surface of the Marman ring, wherein the outboard jaw and the inboard jaw, when grasping the section of the Marman ring, execute a two-stage motion comprising a first movement toward an opposing jaw in a direction parallel to the palm, execute a clamp of the Marman ring across the outer diameter and the inner diameter, and wherein once a threshold clamp preload has been established, a second motion of the outboard jaw and the inboard jaw transitions to a downward motion, normal to the palm, which draws the Marman ring against the palm or other suitable feature in order to rigidize the grasp.

2. The robotic gripper of claim 1, wherein both the inboard, aw and the outboard jaw are configured to actively drive toward each other during a clamping phase of grasping, and wherein both the outboard jaw and the inboard jaw execute a draw-down motion during a draw-down phase.

3. The robotic gripper of claim 1, wherein the inboard jaw is mounted to a gripper chassis in such a way as to constrain five degrees of freedom of motion of the inboard jaw, permitting only linear motion of the inboard jaw in a direction normal to the palm to allow the inboard jaw to follow the outboard jaw during a draw-down phase of gripping, but causing the inboard jaw to remain fixed relative to the gripper chassis during a clamping phase.

4. The robotic gripper of claim 1, wherein the inboard jaw comprises geometric features which work together to correct an orientation of the Marman ring during grasping, the geometric features comprising: a face of the inboard jaw that contacts the inner diameter of the Marman ring and comprises a small draft angle which encourages the inner diameter of the Marman ring to slide down, toward the palm, when the outboard jaw and the inboard jaw are driven together.

5. The robotic gripper of claim 4, wherein the inboard jaw further comprises a ramped tooth which extends slightly proud from the palm and encourages the inner diameter of the Marman ring to lift away from the palm, against an inboard jaw contact surface.

6. The robotic gripper of claim 5, wherein a draft and a tooth of the inboard jaw approximate a V-guide into which the inner diameter of the Marman ring is coaxed during clamp phase of grasping.

7. The robotic gripper of claim 6, wherein at a top of the inboard jaw is a small lip which wraps around an upper surface of an inner diameter flange of the Marman ring, and which is disposed at an angle relative to the inboard jaw contact surface to urge the Marman ring down into a capture zone of the outboard jaw and inboard jaw during clamp-up.

8. The robotic gripper of claim 1, wherein the outboard jaw comprises geometric features which work together to correct an orientation of the Marman ring during grasping, the geometric features comprising a face of the outboard jaw which contacts the outer diameter of the Marman ring, the face comprising a compound revolute geometry including a concave surface disposed between two convex surfaces in order to establish two points of contact on the outer diameter.

9. The robotic gripper of claim 8, wherein the outboard jaw further comprises upper and lower lead-in surfaces possessing a cam profile that guides an outer diameter flange of the Marman ring into a female receiver area and clamping surface of the outboard jaw.

10. The robotic gripper of claim 9, wherein an upper lead-in of the outboard jaw comprises a 15° surface that matches a profile of a clamp band interface surface on an outer flange of the Marman ring.

11. The robotic gripper of claim 1, wherein an inboard jaw and an outboard jaw are mounted in rotatable fashion on respective jaw carriers, the respective jaw carriers each being configured to translate linearly in a fashion that drives them together, thereby imparting, via rotary jaws, simultaneous clamping and draw-down motion through a single underactuated mechanism.

12. The robotic gripper of claim 11, wherein the inboard jaw further comprises a ramped tooth which extends slightly proud from the palm and encourages the inner diameter of the Marman ring to lift away from the palm, against an inboard jaw contact surface, and wherein the ramped tooth articulates relative to the inboard jaw and palm in order to correctly match variable profiles of a variety of Marman rings which the robotic gripper may be called upon to grasp.

13. The robotic gripper of claim 11, wherein a location of a damping surface and a rotation axis of the inboard jaw and the outboard jaw are selected such that a clamping force applied on the clamping surface induces a moment about a respective rotary jaw pivot axis which tends to roll the inboard jaw or the outboard jaw down, drawing an upper lead-in features toward a palm plane and into contact with upper surfaces of an outer diameter flange and an inner diameter flange of the Marman ring.

14. The robotic gripper of claim 11, wherein a draw-down forces induced on the Marman ring by the outboard jaw and the inboard jaw arise solely from motion of the outboard jaw and the inboard jaw induced by clamping forces and are applied simultaneously with the clamping forces.

15. The robotic gripper of claim 1, wherein the robotic gripper is configured to grasp interfaces associated with any of the following spacecraft separation ring geometries:
   a. Atlas V Type A/Delta IV Type 937-4/5 (37.215" ring)
   b. Atlas V Type B & B1/Delta IV Type 1194-4/5 (47.835" ring)
   c. Atlas V Type D/Delta IV Type 1666-4/5 (65.594" ring).

16. The robotic gripper of claim 15, wherein the robotic gripper constrains all six degrees of freedom when coupled to any of a set of interfaces.

17. The robotic gripper of claim 1, wherein the robotic gripper corrects, through mechanical action only or through a combination of mechanical action and robotic compliance control, an orientation of a Marman ring that is misaligned in three translational directions and in roll, pitch and yaw, simultaneously.

18. The robotic gripper of claim 1, further comprising an underactuated draw-down mechanism which transitions a motion of the outboard jaw from a horizontal configuration parallel to the palm to a vertical configuration normal to the palm.

19. The robotic gripper of claim 1, in which a design of the outboard jaw and the inboard jaw approximates three flanged cylinders affecting a three-point contact against the Marman ring during a clamp phase.

* * * * *